(12) United States Patent
Sun et al.

(10) Patent No.: US 12,431,703 B2
(45) Date of Patent: Sep. 30, 2025

(54) WEAK-SIGNAL FAULT IDENTIFICATION OF INVERTER-BASED MICROGRIDS

(71) Applicant: Mitsubishi Electric Research Laboratories, Inc., Cambridge, MA (US)

(72) Inventors: Hongbo Sun, Cambridge, MA (US); Imtiaj Khan, Cambridge, MA (US); Kyeong Jin Kim, Cambridge, MA (US); Jianlin Guo, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 312 days.

(21) Appl. No.: 18/189,529

(22) Filed: Mar. 24, 2023

(65) Prior Publication Data

US 2024/0322555 A1    Sep. 26, 2024

(51) Int. Cl.
*H02H 7/22* (2006.01)
*H02H 1/00* (2006.01)

(52) U.S. Cl.
CPC ............ *H02H 7/22* (2013.01); *H02H 1/0092* (2013.01)

(58) Field of Classification Search
CPC ........ H02H 7/22; H02H 7/263; H02H 1/0061; H02H 1/0092
See application file for complete search history.

(56) References Cited

U.S. PATENT DOCUMENTS 11,255,922 B2 *   2/2022   Yeh .................. H02H 7/226
11,757,278 B1 *   9/2023   Sun .................. H02H 3/265
                                                          361/62

(Continued)

FOREIGN PATENT DOCUMENTS

WO    WO-2018204160 A1 *  11/2018  ............... H02J 3/38

OTHER PUBLICATIONS

Bhaumik et al., "FFT Based Fault Detection and KNN Based Fault Classification in Grid Tied Wind Farm Microgrid," May 2023.*

(Continued)

*Primary Examiner* — Scott T Baderman
(74) *Attorney, Agent, or Firm* — Gene Vinokur

(57) ABSTRACT

Disclosed is a method and system for identifying an existence, location and type of a weak-signal fault in an islanded inverter-based microgrid. The weak-signal fault includes a high impedance fault, an inverter DC-side short-circuit fault, and an inverter tripping fault, and usually fails to be detected by conventional relay methods due to small magnitude of fault current. Upon received voltage and current measurements from intelligent electronic devices installed in the microgrid, the variation mode decomposition algorithm is firstly applied to detect the existence of fault based on denoised time series of measurements using discrete wavelet transform algorithm. After detecting the presence of fault, the correlation-based matrix is applied to locate the suspicious fault locations, and then K-nearest neighbors model is utilized to identify the faulty branch among those locations using dynamic time warping algorithm to measure the distance between neighbors. Following fault localization, fault classification is done by observing sequence components and phasor measurements and feeding the observational inputs to a fault classification logic circuit model.

21 Claims, 19 Drawing Sheets

(56) References Cited

U.S. PATENT DOCUMENTS

| | | | | |
|---|---|---|---|---|
| 2013/0346011 | A1* | 12/2013 | Ou | H02J 3/06 |
| | | | | 702/123 |
| 2017/0179847 | A1* | 6/2017 | Porter | H02M 7/44 |
| 2019/0334344 | A1* | 10/2019 | Alibert | H02H 1/0007 |
| 2019/0341781 | A1* | 11/2019 | Marchegiani | H02J 3/46 |
| 2020/0350761 | A1* | 11/2020 | Wang | H02J 3/32 |
| 2022/0014021 | A1* | 1/2022 | Saleh | H02H 7/26 |
| 2022/0069567 | A1* | 3/2022 | Billaut | H02H 1/0007 |
| 2023/0069168 | A1* | 3/2023 | Manson | H02H 1/0007 |
| 2024/0162838 | A1* | 5/2024 | Pmsvvsv | H02H 7/1227 |
| 2024/0410929 | A1* | 12/2024 | Zamzam | G01R 31/086 |

OTHER PUBLICATIONS

A. N. Milioudis, G. T. Andreou and D. P. Labridis, "Detection and Location of High Impedance Faults in Multiconductor Overhead Distribution Lines Using Power Line Communication Devices," in IEEE Transactions on Smart Grid, vol. 6, No. 2, pp. 894-902, Mar. 2015, doi: 10.1109/TSG.2014.2365855.

L. Zheng, p. Xu, and J. Bai, "Power grid fault location method based on pretraining of Convolutional Autoencoder," In Proc. IEEE Int. Conf. on Computer Science, Artificial Intelligence and Electronic Engineering (CSAIEE), 2021, pp. 324-327.

A. Hooshyar, E. F. El-Saadany and M. Sanaye-Pasand, "Fault Type Classification in Microgrids Including Photovoltaic DGs," in IEEE Transactions on Smart Grid, vol. 7, No. 5, pp. 2218-2229, Sep. 2016, doi: 10.1109/TSG.2015.2451675.

* cited by examiner

| $C(i,j)$ | 1 (M1) | 2 (M2) | 3 (M3) | 4 (M4) |
|---|---|---|---|---|
| 1 (M1) | 1 | 0.789 | 0.831 | 0.798 |
| 2 (M2) | 0.789 | 1 | 0.982 | 0.935 |
| 3 (M3) | 0.831 | 0.982 | 1 | 0.971 |
| 4 (M4) | 798 | 0.935 | 0.971 | 1 |

CORRELATION MATRIX FOR BRANCH 1

FIG. 9

CORRELATION MATRIX FOR BRANCH 2

| C(i,j) | 1 (M5) | 2 (M6) | 3 (M7) | 4 (M8) |
|---|---|---|---|---|
| 1 (M5) | 1 | 0.966 | 0.695 | 0.717 |
| 2 (M6) | 0.966 | 1 | 0.486 | 0.513 |
| 3 (M7) | 0.695 | 0.486 | 1 | 0.996 |
| 4 (M8) | 717 | 0.513 | 0.996 | 1 |

FIG. 10

| $C(i,j)$ | 1 (M9) | 2 (M10) | 3 (M11) | 4 (M12) |
|---|---|---|---|---|
| 1 (M9) | 1 | 0.941 | 0.218 | 0.206 |
| 2 (M10) | 0.941 | 1 | 0.124 | 0.136 |
| 3 (M11) | 0.218 | 0.124 | 1 | 0.997 |
| 4 (M12) | 0.206 | 0.136 | 0.997 | 1 |

CORRELATION MATRIX FOR BRANCH 3

FIG. 11

KNN ACCURACY

| Number of neighbours K | Accuracy (%) | Accuracy with random noise |
|---|---|---|
| K = 2 | 87.88 | 87.88 |
| K = 3 | 100 | 100 |
| K = 4 | 90.9 | 90.9 |
| K = 5 | 87.88 | 87.88 |
| K = 6 | 75.5 | 75.5 |

FIG. 12

EFFECTIVENESS OF PROPOSED MODEL

| Threshold $\tau$ | Number of FP: correlation matrix only | Number of FP: correlation matrix + KNN |
|---|---|---|
| 0.9 | 7 | 0 |
| 0.95 | 9 | 2 |
| 0.98 | 10 | 3 |

FIG. 13 ations for all PLC devices installed along the line. The major limitation of this approach exists in the availability of PLC devices.

WEAK-SIGNAL FAULT IDENTIFICATION OF INVERTER-BASED MICROGRIDS

TECHNICAL FIELD

The present invention relates generally to electric power systems, and more particularly to weak signal fault identification of inverter-based microgrids.

BACKGROUND

Microgrids have been attracting much more attention recently with the development of a renewable-energy-aware society. Microgrids are localized power grids that can disconnect from the traditional power grid to operate autonomously and are thereby able to strengthen grid reliability and mitigate grid disturbance. The operation of microgrids is very flexible in that they can operate in both grid-connected and islanded modes. However, the characteristics of a microgrid, such as fault levels and control strategies of inverter-based distributed generators could vary considerably for different operation modes. Therefore, traditional fault protection schemes may not be applicable to islanded microgrids.

The fault current in a microgrid varies depending on the type of distributed generations, operating conditions, and network topology. As a result, traditional overcurrent relays become unreliable. If the faults are weak-signal faults, the issue becomes even more complex. Weak-signal faults, such as high impedance faults, inverter DC-side short-circuit faults, and inverter tripping faults that occur in distribution networks are too small in magnitude that they often bypass the conventional relays without getting detected. Undetected weak-signal faults will pose security threat to human lives and the power grid. Taken high impedance faults as example, the energized conductors in contact with the ground surface are dangerous for animal and plant life and cause losses. Weak-signal faults are common and the growth and need for distributed generations will only augment the occurrence of such low current faults. Hence, a rapid and reliable fault identification, including fault detection, location and classification is necessary for restoring grid power supply and ensuring the safety of surrounding area.

There are some related works existing in weak-signal fault identification of microgrids. An example for this research can be found in a paper written by Vineeth and P. Sreejaya titled as "High Impedance Fault detection in Low Voltage Distribution Systems Using Wavelet and Harmonic Fault Indices" published at 2020 IEEE International Conference on Power Electronics, Smart Grid and Renewable Energy (PESGRE2020), 2020, pp. 1-6. In the paper, the authors used multi-resolution wavelet analysis to detect the disturbances created in neutral current by a fault. However, how to choose a proper mother wavelet function is a critical question to be answered for its practical application.

Another example is detecting high impedance faults and determining the fault locations by using power line communication (PLC) devices which were proposed by A. N. Milioudis, G. T. Andreou and D. P. Labridis in their paper titled as "Detection and Location of High Impedance Faults in Multiconductor Overhead Distribution Lines Using Power Line Communication Devices" that was published in IEEE Transactions on Smart Grid, vol. 6, no. 2, pp. 894-902, March 2015. The proposed method derives the fault location of the faulty line based on the responses of impulse injec- Yet another example is using machine learning such as convolutional autoencoder to locate the power grid fault which was proposed by L. Zheng, P. Xu, and J. Bai in their paper titled "power grid fault location method based on pretraining of Convolutional Autoencoder" that published in Proc. IEEE Int. Conf. on Computer Science, Artificial Intelligence and Electronic Engineering (CSAIEE), 2021, pp. 324-327. The method pre-trained lots of samples by using convolutional autoencoder, and then used a classifier to fine-tune small batches of balanced samples. However, such approaches are highly dependent on the grid topology and equipment status, and also require increased computational complexities.

Some other example is presented in a paper tiled as "Fault Type Classification in Microgrids Including Photovoltaic DGs" which classified weak signal faults in power grid using relative behavior of voltage magnitude and phase angle measurements. The paper was authored by A. Hooshyar, E. F. El-Saadany and M. Sanaye-Pasand, and published in IEEE Transactions on Smart Grid, vol. 7, no. 5, pp. 2218-2229, September 2016. However, such approach may produce false positive cases, since changes in load, line capacitance or operating of switches may cause the voltage magnitude and angle behave in a similar manner as the faults.

Therefore, there is a need for developing more accurate methods for identifying weak-signal faults in inverter-based microgrids.

SUMMARY OF THE INVENTION

The present disclosure provides a combined weak-signal fault detection, localization, and classification method for islanded inverter-based microgrids. The disclosed method identifies weak-signal faults using time-series measurements of voltage, current and power collected from intelligent electronic devices (IEDs) installed within the microgrids. The weak-signal fault can be an inverter-related fault, or a high impedance fault. The inverter-related weak-signal fault is an inverter DC side short-circuit fault or an inverter tripping fault. The high impedance fault is a line to ground fault with high fault impedance, wherein the type of line to ground fault is a triple line to ground fault, a double line to ground fault, or a single line to ground fault.

Some embodiments of the present invention provide a two-step scheme for weak-signal fault detection, in which the measurements are first denoised with reconstruction using discrete wavelet transform (DWT), and then the existences of weak signal faults are detected through analysis of frequency components generated by variational mode decomposition (VMD) using denoised measurements. The performance of this two-step scheme is less sensitive to the noise since the weak signal faults are analyzed by using denoised data reconstructed by the DWT. This is verified by experimental tests for both noisy and clean data. Meanwhile, this two-step fault detection scheme is scalable to a larger system irrespective of the grid configuration.

Some embodiments of the present invention provide a hybrid method to determine the fault location after the presence of fault is detected. In the method, correlations between time-series current components between two consecutive IEDs is first utilized to locate the suspicious fault locations, and then the final fault location is confirmed by identifying the branch containing fault using time-series K-nearest neighbors (KNN) model with neighbor distance measured by dynamic time warping (DTW). After properly tuned hyper-parameters of correlation threshold and number of nearest neighbors, near perfect accuracy can be achieved for localization of weak signal faults, since the disclosed hybrid model emphasizes on the reduction of false positive cases.

Some other embodiments of the present invention provide a logic-circuit based fault classification method, in which the relationship between sequence components of currents along with voltage and current phasor measurements with fault types are exploited. The test shows the disclosed method can classify the faults among high impedance faults, inverter DC-side short-circuit and inverter tripping with 100% accuracy, with an exception to an uncertainty between double line to ground and single line to ground faults. The fault classification is also scalable to a larger system irrespective of the grid configuration.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 9 is a schematic table illustrating a correlation matrix for branch 1, according to some embodiments of the present disclosure;

FIG. 10 is a schematic table illustrating a correlation matrix for branch 2, according to some embodiments of the present disclosure;

FIG. 11 is a schematic table illustrating a correlation matrix for branch 3, according to some embodiments of the present disclosure;

FIG. 12 is a schematic table illustrating the accuracy of K-nearest neighbors (KNN) model, according to some embodiments of the present disclosure;

FIG. 13 is a schematic table illustrating the effectiveness of disclosed method, according to some embodiments of the present disclosure;

DETAILED DESCRIPTION OF THE PREFERRED EMBODIMENTS

Overview

The present disclosure relates generally to electric power systems, and more particularly to weak-signal fault identification of inverter-based microgrids.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

This disclosure is targeted to fault identification of an islanded inverter-based microgrid which contains both inverter-based generators with grid-forming and grid-following control strategies, and traditional synchronous generators, and intelligent electronic devices (IEDs) are installed for switchable devices to provide high-fidelity waveform measurements for microgrid operators. The weak-signal faults include high-impedance line to ground faults, inverter DC-side short circuit faults, and inverter tripping faults. The weak-signal fault identification is divided into three stages to be solved. At the first stage, the existence of weak-signal fault is detected with a combined discrete wavelet transform (DWT) and variation mode decomposition (VMD) method. At the second stage, the fault location for the detected weak-signal signal fault is determined by incorporating correlation matrix with K-nearest neighbors (KNN) model. The third stage is determining the fault type using a logic circuit model defined by exploiting the relative behaviors of sequence components and phasor measurements.

Figure 1A:
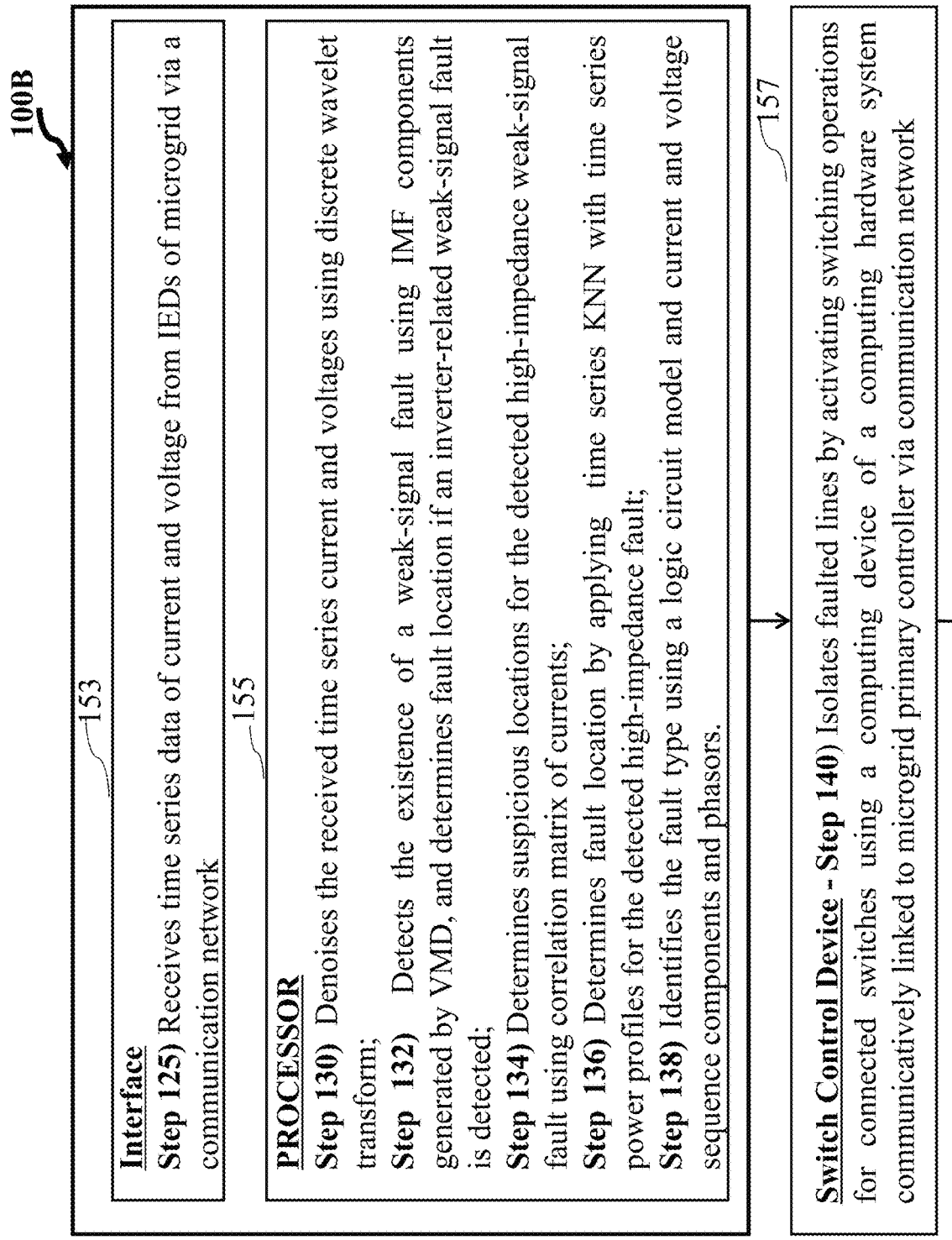
FIG. 1A is a block diagram illustrating a method for detecting, locating and classifying weak-signal faults of an inverter-based microgrid, according to embodiments of the present disclosure.

FIG. 1A is a block diagram illustrating a method (i.e., computer-implemented method) 100B for detecting, locating and classifying weak-signal faults of an islanded inverter-based microgrid using an interface 153, switch control devices 157, a hardware processor 155, a memory having instructions stored thereon that cause the hardware processor to perform steps of the method 100B, according to embodiments of the present disclosure.

Step 125 includes method 100B using an interface 153 to receive time series data of current and voltage from intelligent electronic devices (IEDs) installed in the microgrid via a communication network.

Step 130 includes method 100B using a hardware processor 155 to denoise the received time series current and voltages for each IED using discrete wavelet transform.

Still referring to step 132 of FIG. 1A, the hardware processor 155 to detect the existence of a weak-signal fault using IMF components generated by VMD from denoised time series, and determines fault location if an inverter-related weak-signal fault is detected. Through Step 132, the weak-signal fault if detected is further classified as an inverter-related fault or a high impedance fault. For the identified inverter related fault, a fault location is determined according to currents and voltages at AC side of corresponding inverter, then go to Step 138 for further fault type classification. For the high impedance fault, moves to next step to determine fault locations.

Step 134 using the hardware processor 155 to determine suspicious locations within the microgrid for the weak-signal fault using correlation matrix of currents if the detected fault is a high-impedance fault.

Step 136 using the hardware processor 155 to determine fault location by applying time series KNN model with timeseries power profiles, in which power profiles can be derived using time series current and voltage data if not directly measured.

Step 138 using the hardware processor 155 to identify the fault type using a logic circuit model and current and voltage sequence components and phasors.

Still referring to step 140 of FIG. 1A, includes method 100B to isolate faulted line segments by activating switching operations for connected switches using a computing device 157 via communication network.

Figure 1B:
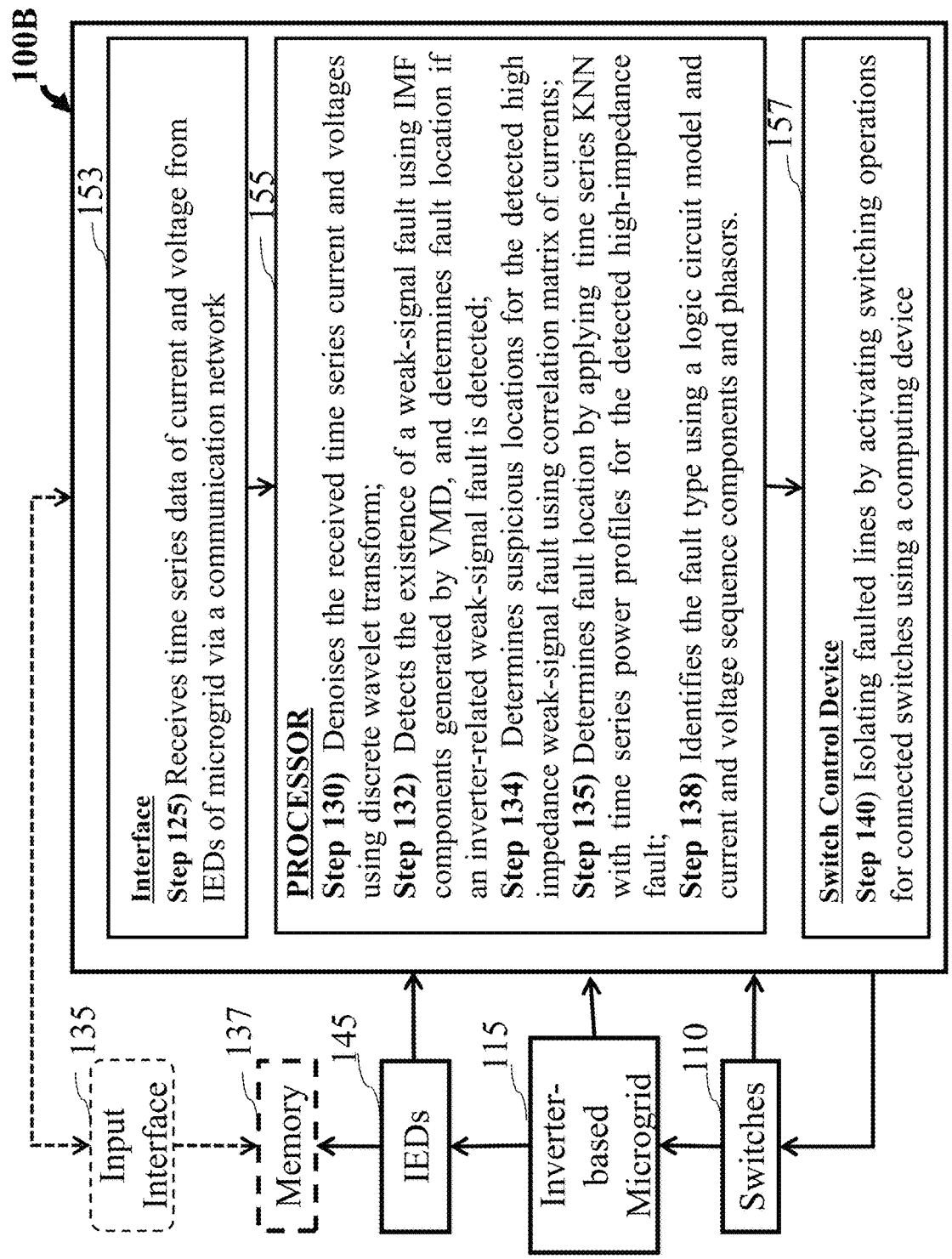
FIG. 1B is a schematic illustrating components and steps of detecting, locating and classifying weak-signal faults of an inverter-based microgrid, according to embodiments of the present disclosure.

FIG. 1B is a schematic illustrating components and steps of detecting, locating and classifying weak-signal faults of an islanded inverter-based microgrid, according to embodiments of the present disclosure.

FIG. 1B can include a hardware processor 155 in communication with an input interface 135, a memory 137, an interface 153, a computing device 157. The computing device 157 can be connected to the set of switches 110 that installed in the microgrid 115. The microgrid can have a set of intelligent electronic devices (IEDs) 145 to monitor and collect the condition information of the microgrid 115. The condition information are timeseries measurements of currents and voltages measured by the IEDs 145. Each IED corresponds to a switchable device 110. The fault identification and control system implemented with method 100B can control the set of switches 110 as well as can send and receive information. It is contemplated the hardware processor 155 can include two or more hardware processors depending upon the requirements of the specific application. Certainly, other components may be incorporated with method 100B including input interfaces, output interfaces and transceivers.

Still referring to FIG. 1B, aspects of the system 100B include step 125 of using an interface 153 to receive time series data of current and voltage from IEDs of microgrid via a communication network.

Step 130 includes method 100B using a hardware processor 155 to denoise the received time series current and voltages using discrete wavelet transform for each IED in the microgrid.

Step 132 includes detecting the existence of a weak-signal fault using IMF components generated by VMD, and determines fault location if an inverter-related fault is detected. Step 132 further identifies the detected weak-signal fault is an inverter-related fault or a high impedance fault. After a fault location is determined according to currents and voltages at AC side of corresponding inverter for an inverter-related fault, then move to step 138. Otherwise, move to next step 134 if the detected fault is not an inverter-related fault.

Step 134 determining suspicious locations for the weak-signal fault using correlation matrix of currents if the detected fault is a high-impedance fault.

Step 136 includes determining fault location by applying time series KNN model with time series power profiles.

Step 138 includes identifying the fault type using a logic circuit model and current and voltage sequence components and phasors.

Step 140 includes method 100B to isolate faulted line segments by activating switching operations for connected switches using a computing device 157 via communication network.

Figure 1C:
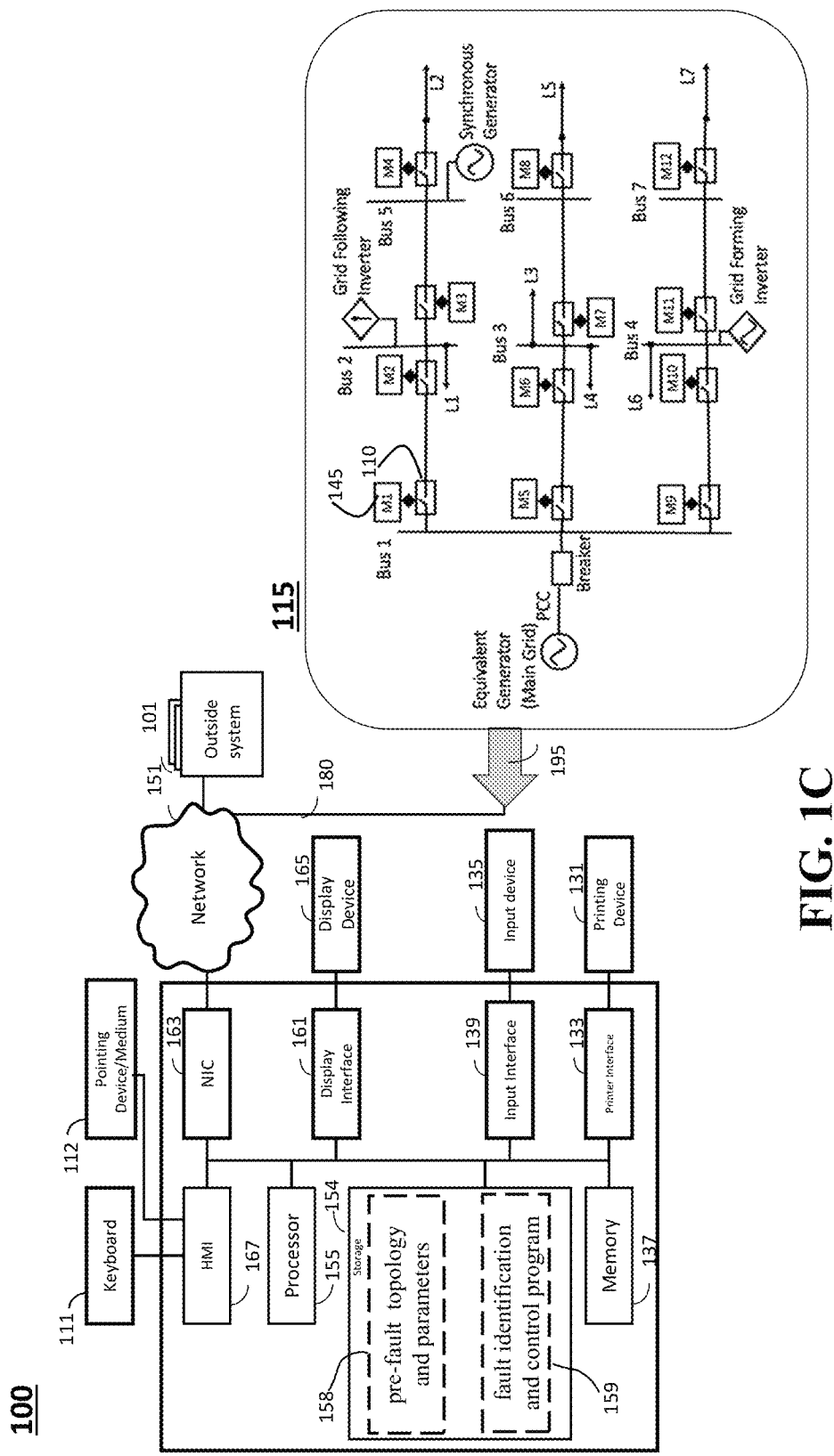
FIG. 1C is a block diagram illustrating a fault identification and control system for detecting, locating and classifying weak-signal faults in an inverter-based microgrid, according to some embodiments of the invention

FIG. 1C shows a block diagram of a fault identification and control system 100 for in an islanded inverter-based microgrid according to some embodiments of the invention.

The fault identification and control system 100 includes a human machine interface (HMI) 167 connectable with a keyboard 111 and a pointing device/medium 112, a processor 155, a storage device 154, a memory 137, a network interface controller 163 (NIC) connectable with a network 151 including local area networks and internet network, a display interface 161 connected to a display device 165, an input interface 139 connectable with an input device 135, a printer interface 133 connectable with a printing device 131. The memory 137 is configured to load the fault identification and control program 159 by associating with the storage device 154 when executing the method 100B. In some cases, the memory 137 and the storage device 154 may be referred to as a memory.

The fault identification and control system 100 can receive electric signals 195 indicating timeseries measurements of currents and voltages of intelligent electronic devices 145 arranged in an inverter-based microgrid 115 via the network 151 connected to the NIC 163. The network 151 is connected to an outside system(s) 101 that can provide control signals to the intelligent electronic devices of the microgrid 115 for performing remote control of the intelligent electronic devices. Further, the fault identification and control system 100 can provide the outside system 101 fault identification status data (signals) via the network 151 so that the outside system 101 can control switching operation arranged in the microgrid 115. Further, the fault identification and control system 100 can be controlled from the outside system 101 by receiving control data (signals) of the fault identification and control system 100 via the network 151.

The storage device 154 includes pre-fault topology and parameters 158 with respect to the microgrid 115 and a fault identification and control program module 159. The input device/medium 135 may include modules that read programs stored on a computer readable recording medium (not shown).

For identifying a weak-signal fault in the microgrid 115, the fault identification and control system 100 may receive the status data of the microgrid from the intelligent electronic devices 145 included in the microgrid 115.

In accordance with some embodiments of the present invention, the microgrid 115 may include a set of terminal buses connected with line segments, and a set of inverter-based, or synchronous generators. The microgrid 115 includes IEDs connected with a microgrid controller (not shown) installed in the microgrid 115. The microgrid controller connected to the IEDs is configured to operate and control the microgrid 115 by isolating and restoring the microgrid using switches of IEDs in response to receiving a fault identification command indicative of the fault location and the fault type of weak-signal faults. In this case, the fault identification command is transmitted from the fault identification and control system 100 to microgrid controller. In some cases, the microgrid controller is installed in the outside system 101 to control the microgrid via the outside system 101. Further, the fault identification command can be transmitted to a display monitor including a display interface (not shown) installed in the outside system 101 to indicate a warning to an operator of the outside system 101 regarding the condition of the fault location and the fault type of weak-signal faults. The fault identification and control system 100 uses the fault identification command to show the operation status of the microgrid 115 on the display monitor of the outside system 101 by transmitting the fault identification command to the display interface of the display monitor install in the outside system 101. The fault identification and control system 100 uses the interface 153 to receive timeseries measurement data indicating currents and voltages measured for intelligent electronic devices via the network 151 (communication network). The memory 137 can load the computer-executable programs stored in the storage 154, in which the computer-executable programs include a pre-fault (normal status) topology and parameters 158 and a fault identification and control program (module) 159 configured to identify the weak-signal faults caused in the microgrid 115 and determine control scheme for the faults in the microgrid 115. At least one processor 155 in connection with the memory 137 and the interface 153 are used to perform the fault identification and control program 159 loaded from the storage 154. For instance, when performed by the processor 155, the fault identification and control program 159 causes the processor 155 to receive voltage and current measurements 195 from intelligent electronic devices 145, and the processor 155 determines if a weak-signal fault is caused in the microgrid 115 by executing the fault identification and control program 159 to examine the intrinsic mode frequency components generated by the variation mode decomposition algorithm based on time series of measurements denoised using discrete wavelet transform algorithm. If the existence of fault is detected, the fault identification and control program 159 further requests the processor 155 to provide the normal connectivity topology and parameters from the storage 154, and then the program 159 first determines suspicious fault locations based on the correlation matrices for adjacent intelligent electronic devices, and narrow down to the faulty location among those locations by utilizing K-nearest neighbors with the distance between neighbors measured by dynamic time warping algorithm. Following the fault location is identified, the fault identification and control program 159 further identifies the fault type by monitoring sequence components and phasor measurements and feeding the observational inputs to a logic circuit model. Then the processor 155 outputs a post-fault topology indicating a location of the fault, and associated switch operations required by the determined fault control scheme. Further, the interface (NIC) 163 can receive the measured signals 195 every preset period of time via the network 151 from the microgrid 115. When the fault identification and control system 100 does not determine/detect any faults of the microgrid 115 while receiving timeseries measurements of currents and voltages indicative of predetermined normal signal ranges from IEDs installed in the microgrid 115, the fault identification and control system 100 can produce a normal status command and transmit the signal of the normal status command to the display interface of the display monitor installed in the outside system 101 via the network 151 to show the normal operation status of thee microgrid 115 on the display monitor of the outside system 101. The data of the normal status commend and fault identification command produced by the fault identification and control system 100 can be transmitted to other maintenance system(s) via the network 151 to allow it (them) to monitor the operation statuses of the microgrid 115.

In some cases, the instructions to start/perform identifying the faults may be transmitted to the fault identification and control system 100 using the keyboard 111 or from the outside system 101 via the network 151.

Inverter-Based Microgrid Definition and Simulation

A microgrid is a group of interconnected loads and distributed energy resources that acts as a single controllable entity with respect to the main grid. It can connect and disconnect from the main grid to operate in grid-connected or islanded mode. The distributed energy resources can be a generation source as traditional synchronous generators, or power inverter-based generators. The loads are supplied by the generators through distribution lines. The intelligent electronic devices (IEDs) are installed within the microgrid to provide real-time information for the microgrid controller to manage grid's operation and control.

An Intelligent Electronic Device is a term used to describe microprocessor-based controllers of power system equipment, such as protective relaying devices, tap changer controllers, circuit breaker controllers, capacitor bank switches, recloser controllers, and voltage regulators. In this disclosure, each IED is related to a switchable device.

Figure 2A:
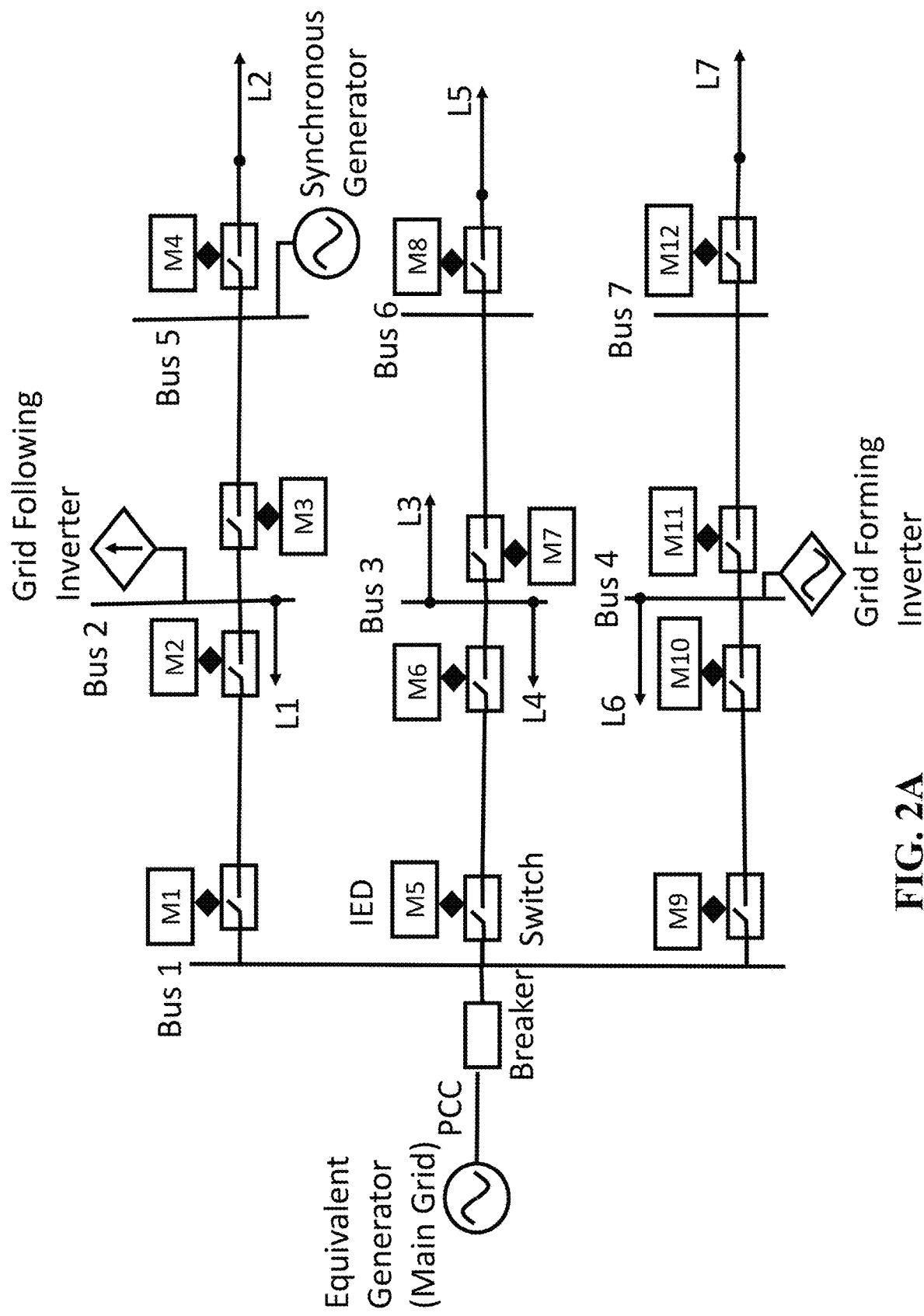
FIG. 2A is a schematic illustrating an inverter-based microgrid, according to embodiments of the present disclosure.

FIG. 2A shows an exemplar inverter-based microgrid with 7 buses. It is connected to a three phase 25 kV, 200 MVA synchronous generator at bus 5, and a 3-phase equivalent generator at bus 1 representing the main grid. The microgrid is operated under islanded mode, that is, the equivalent generator at bus 1 is disconnected from the microgrid. Bus 2 and 4 contain two inverters. A grid forming inverter (GFM) is connected to bus 4, and a grid following inverter (GFL) is connected to bus 2, both are connected to the respective buses through respective PCC of the inverter. Load L1 is rated as 200 kW and 4.16 kV. Load L2 through L7 are rated as 100 kW and 4.16 kV. Two separate PV panels are connected to each of the inverters through inverter control and IGBT switches. The DC output from each PV panel is represented with 8000V DC source connected to each inverter. Measurements are collected from 12 IEDs installed at the locations as shown in FIG. 2A. The microgrid contains 3 branches. Branch 1 includes IEDs M1-M4, branch 2 includes IEDs M5-M8, and branch 3 includes IEDs M9-M12, respectively. Line-to-ground faults are applied at different locations of the grid. As indicated in FIG. 1C, the IEDs M1-M12 include switches configured to isolate and restore the microgrid in response to a fault identification command received from the fault identification and control system 100. Each of the IEDs is configured to provide/transmit datasets/signals with respect to the variation statuses of sequence components and phasor measurements via the network 151.

Any system of three unbalanced phasors can be resolved in three symmetrical components, including positive sequence which represents a balanced three-phase system with the same phase sequence as the original sequence, negative sequence which represents a balanced three-phase system with the opposite phase sequence as the original sequence, and zero sequence which represents a system in which three phasors are equal in magnitude and phase.

Figure 2B:
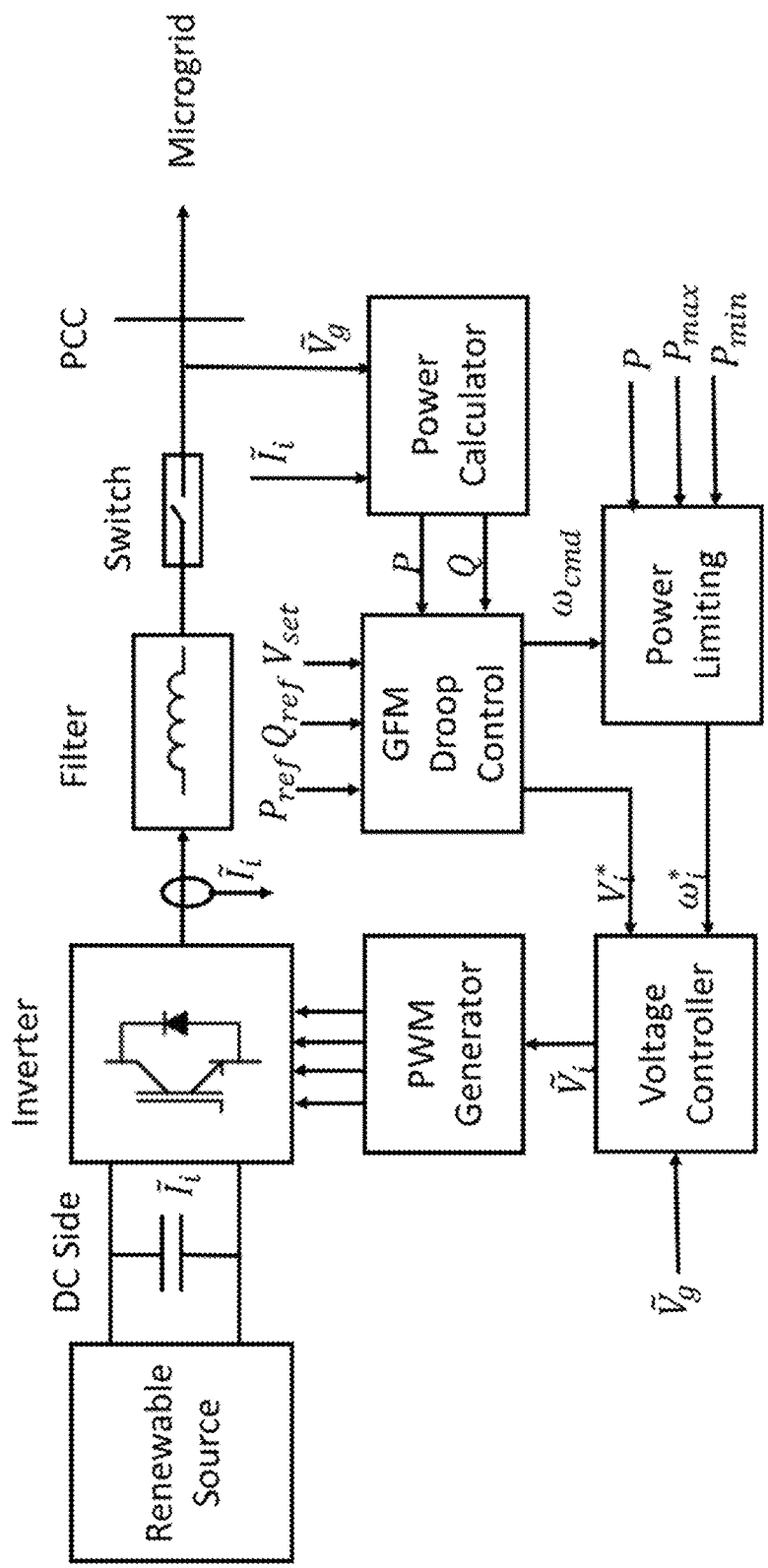
FIG. 2B is a schematic illustrating a grid-forming inverter used in a microgrid, according to embodiments of the present disclosure.
Figure 2C:
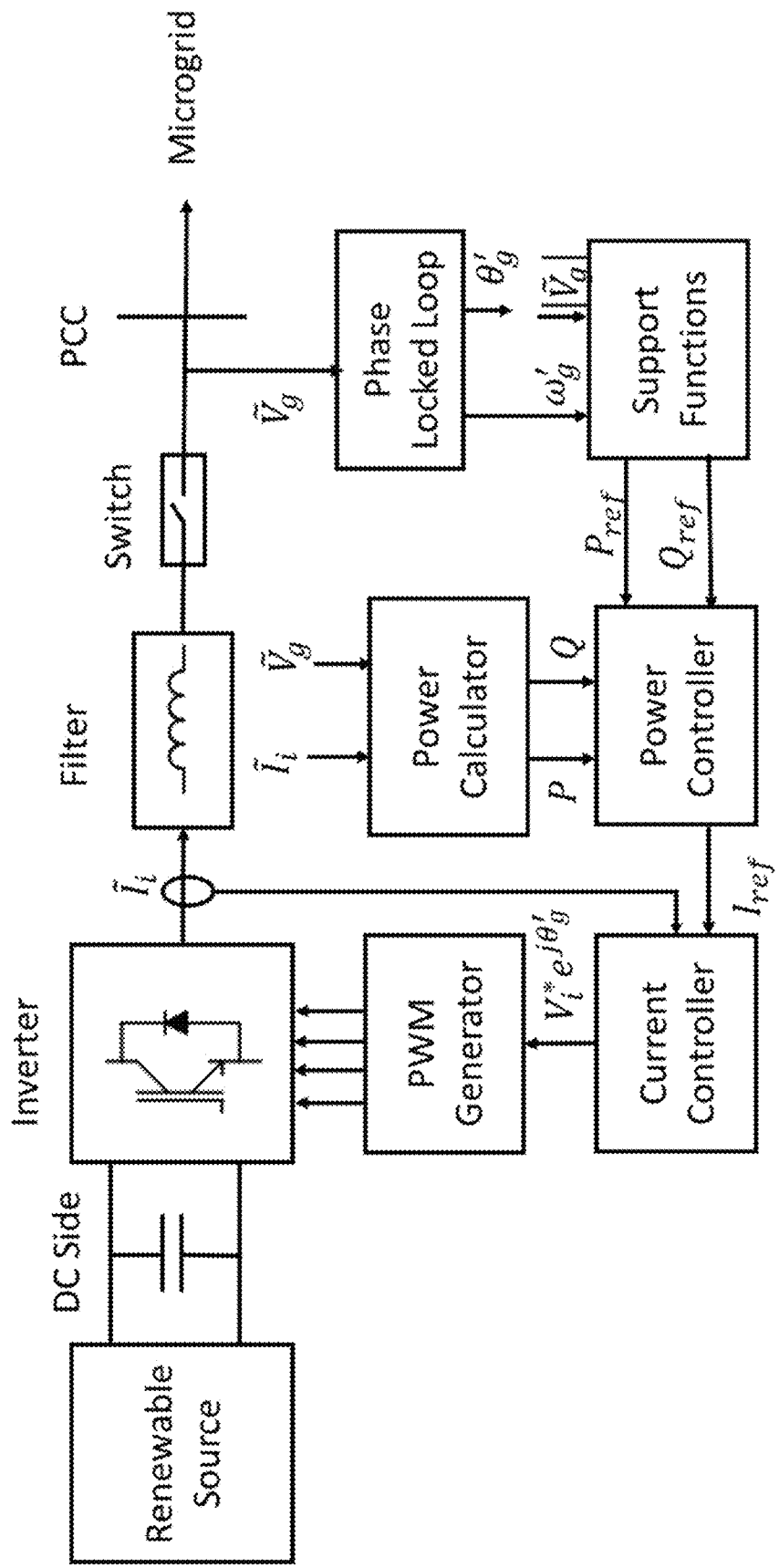
FIG. 2C is a schematic illustrating a grid-following inverter used in a microgrid, according to embodiments of the present disclosure.

As shown in FIG. 2A, there are two basic control technologies for utility-based inverters. They are grid-forming (GFM) inverter (FIG. 2B) and grid-following (GFL) inverter (FIG. 2C). Compared to large synchronous machines, inverter-based resources are able to change their output much faster, arresting system's frequency changes before any load shedding is triggered.

A GFM inverter is a controllable voltage source behind a coupling reactance much like grid-tied synchronous generators. Voltage source inverters with droop characteristic allows for direct control of voltage and frequency. During contingencies, the droop-controlled GFM sources will increase or decrease their output power instantaneously to balance loads and maintain local voltage and frequency. There is no significant delay between the change of output power and the change of output frequency in droop-controlled GFM inverters. Therefore, GFM sources respond much faster to any contingencies than the response of the GFL sources. The GFM inverter can be regarded as Voltage source (PV bus).

A GFL inverter controls the output of real and reactive power by injecting current at a given phase angle. A phase-locked loop (PLL) is used to track the grid phase angle in real time. The GFL inverter cannot directly provide regulating system voltage and frequency. Voltage and frequency reference is provided externally either by a GFM inverter or the main grid. Fundamentally, if the GFL inverter loses a voltage/frequency source it must shut down. The GFL inverter can be regarded as a Current source (PQ bus).

Weak Signal Fault Detection for Islanded Inverter-Based Microgrid

The weak signal faults in the microgrids are detected by using two-step time-domain frequency component analysis-based approach including discrete wavelet transform (DWT), and variational mode decomposition (VMD).

A discrete wavelet transform (DWT) is a transform that decomposes a given signal f into a number of sets, where each set is a time series of coefficients describing the time evolution of the signal in the corresponding frequency band. DWT can be used to denoise a noisy signal by synthesizing the original signals into different wavelet components with preset wavelet function, decomposition level and signal extension mode, and then compress noise components by applying signal thresholding algorithm with preset thresholding value and mode. The basic idea behind DWT based denoising is that the DWT concentrates signal features in a few large-magnitude wavelet coefficients. Wavelet coefficients which are small in value are typically noise and those coefficients can be shirked or removed without affecting the signal quality. After thresholding the coefficients, the data can be reconstructed.

For any noisy signal, DWT decomposes the original time series dataset into an approximation component with high scale and low frequency, and a set of detail components with high frequency and low scale at different resolution levels. The approximate and details are defined by summing approximate and detail functions weighted by corresponding approximate and detail coefficients, and each of approximate and detail functions is unique to a basic wavelet function. The following steps can be used to denoise the noisy signal: (1). Appling a forward discrete wavelet transform to the data with a pre-set wavelet function with a preset-signal extension mode and a preset-decomposition level, and then obtain a list of coefficients for approximation and detail functions. (2). Applying a signal Thresholding technique to detail coefficients with a pre-set thresholding value and a preset thresholding mode. (3). Applying an Inverse Discrete Wavelet Transform to reconstruct the signal using approximate and detail coefficients after thresholding with the same settings of basic wavelet function, signal extension mode and decomposition level. The exemplar settings for above DWT denoising are: the wavelet function is a Wavelet Daubechies 4 function, the decomposition level is set as 5, the signal extension mode is periodic-padding, the thresholding mode is soft thresholding, and the thresholding value is 0.4.

VMD is an adaptive and quasi-orthogonal decomposition algorithm, aiming at separating the noisy signal f into κ discrete frequency modes, which are compact around (estimated) center frequency of each mode $\omega_k$. VMD is first to obtain unilateral frequency spectrum by applying Hilbert transform to each mode (estimated) $u_k$, then shift the frequency spectrum of each mode to baseband by mixing an exponential component centered around estimated mode frequency, and the final output is a set of k intrinsic mode function (IMF) components, and each of which represents a harmonic component $u_k$ at frequency $\omega_k$. An IMF represents a generally simple oscillatory mode as a counterpart to the simple harmonic function. By definition, the IMF is any function with the same number of extrema and zero crossings, whose envelopes are symmetric with respect to zero.

For the disclosed two-step approach, the first step involves signal reconstruction using Discrete Wavelet Transform (DWT) technique, which removes noise from the input signal, i.e., current and voltage data from measurement devices. The goal of the first denoising step is to make the disclosed approach immune to noises. In practical applications, there exists several measurement and system noises, which cause faulty inference from output. The disclosed two step approach reduces the dependence of algorithm robustness against such noises. The second step takes reconstructed signal as inputs and the inputs are synthesized as intrinsic mode function (IMF) components by using the VMD algorithm. In particular, each of the IMF components represent an individual harmonic component in time domain, and it is expected that over the duration of weak signal fault, one or more IMF components will demonstrate an observable change. The second step provides time-series data for each IMF components, thereby indicating the existence of any high frequency smaller magnitude components in the measurements.

One major advantage of the disclosed approach is that being scalable to grid system with a different configuration. For any type of grid configuration and topology, due to the existence of temporal relation among the neighboring locations of the grid, the measurements from a location relatively far away from the fault source will display some extent of variability over the fault period. Therefore, IMF components of the measurements from any location neighboring to the actual fault source, irrespective of grid topology, can detect the occurrence of weak signal fault.

To demonstrate the validity of disclosed method, typical faults of the microgrid represented by FIG. 2A are simulated using MathWorks SIMULINK.

Each of types of line to ground faults, including triple lone to ground (TLG) fault, double line to ground (DLG) fault and single line to ground (SLG) fault are applied near bus 2 and bus 4 separately. TLG is simulated with a phase A to phase B to phase C to ground faults, therefore it is described as ABCG fault. Similarly, DLG and SLG are simulated with phase A to phase B to ground and phase A to ground fault respectively, therefore they are described as ABG fault, and AG fault, respectively. Inverter DC-side short circuit is modelled by shorting out the DC supply from PV panel of each inverter separately. Inverter trip is represented by tripping the three-phase connection near the Point of Common Coupling (PCC) for each inverter. Each fault type at each of the two aforementioned locations are applied at time 2.5 sec. and are removed at 3.0 sec. The inverter trip is applied from 2.5 sec. to 2.6 sec.

Current and voltage phasors, current and voltage sequence components, real and reactive power measurements are collected from the time interval, from 2.0 sec. to 3.5 sec. The dataset is sampled at a frequency of 1 kHz, providing 1500 measurements over 1.5 sec time period.

FIGS. 3-7 demonstrate current waveforms for different type of weak-signal faults simulated in the microgrid as shown by FIG. 2A. The waveforms are generated by VMD algorithm implemented with total number of IMF modes predefined as 5. The current and voltage measurements received from IEDs are first denoised with DWT, and then fed into VMD as inputs.

Figure 3:
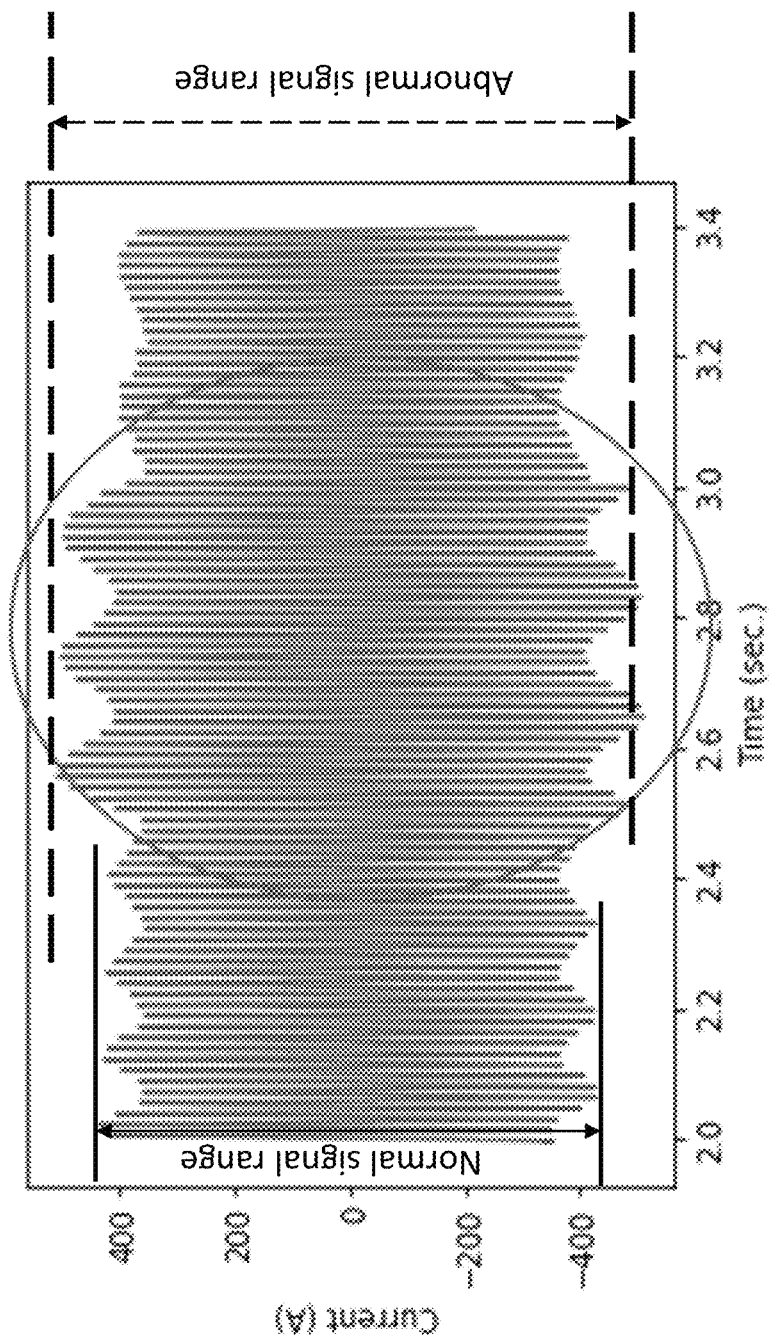
FIG. 3 is a schematic illustrating a current waveform for triple line to ground (TLG) fault with intrinsic mode function (IMF) mode 1, according to some embodiments of the present disclosure.

FIG. 3 shows a current waveform for ABCG fault with IMF mode 1. Then current measurement is collected at IED M5 for a ABCG fault at the three-phase line near bus 4, with fault impedance 6000Ω. As shown in FIG. 3, a noticeable abnormal signal variation in the current waveform can be identified from 2.5 sec. to 3.0 sec., that is the fault duration described above. Even though the fault is located near bus 4, the current measurement in FIG. 3 is from IED M5, reflecting the effectiveness of VMD algorithm to indicate the existence of high impedance fault using measurement from any locations of the grid.

The abnormal signal variation of a measured signal is identified when a ratio of an absolute value of a length difference between a normal signal range of the measured signal and an abnormal signal range of the measured signal, over a length of the normal signal range of the measured signal is greater than a faulty threshold. The faulty threshold may be defined as a ratio based on difference between the normal signal range and the abnormal signal range. The normal signal range and abnormal signal range are determined based on the variation ranges of the measured signal over a given time period (such as 2.0 sec. to 3.0 sec.) with a preset length, such as approximately 1.0 second.

The faulty threshold is preset, such as approximately 0.15. The faulty threshold can be stored in the storage 154 and used for automatically detect the fault in the microgrid 115 using the fault identification and control system 100.

The above-described approach is a static approach. The identification can also be achieved by using a dynamic approach based on comparison of signal variations among consecutive monitoring time windows with identical width. The abnormal signal variation of a measured signal is identified when a ratio of an absolute value of a length difference between signal variation ranges of the measured signal at two consecutive monitoring time windows, over a length of the signal variation range of the measured signal at the first monitoring time window of the two consecutive monitoring time windows is greater than a faulty threshold. The width of monitoring time windows is pre-set, such as 0.1 seconds. For example, the maximum current range in FIG. 3 have changed from around 800 amperes at first time window (i.e. 2.4 sec to 2.5 sec) to around 1000 amperes at second time window (i.e. 2.5 sec to 2.6 sec). If the fault threshold is set as 0.15, then the ratio of absolute difference (around 200 amperes) over around 800 amperes is around 0.25 which is greater than the fault threshold (i.e. 0.15), then the abnormal signal variation starting from 2.5 sec. is identified.

Figure 4:
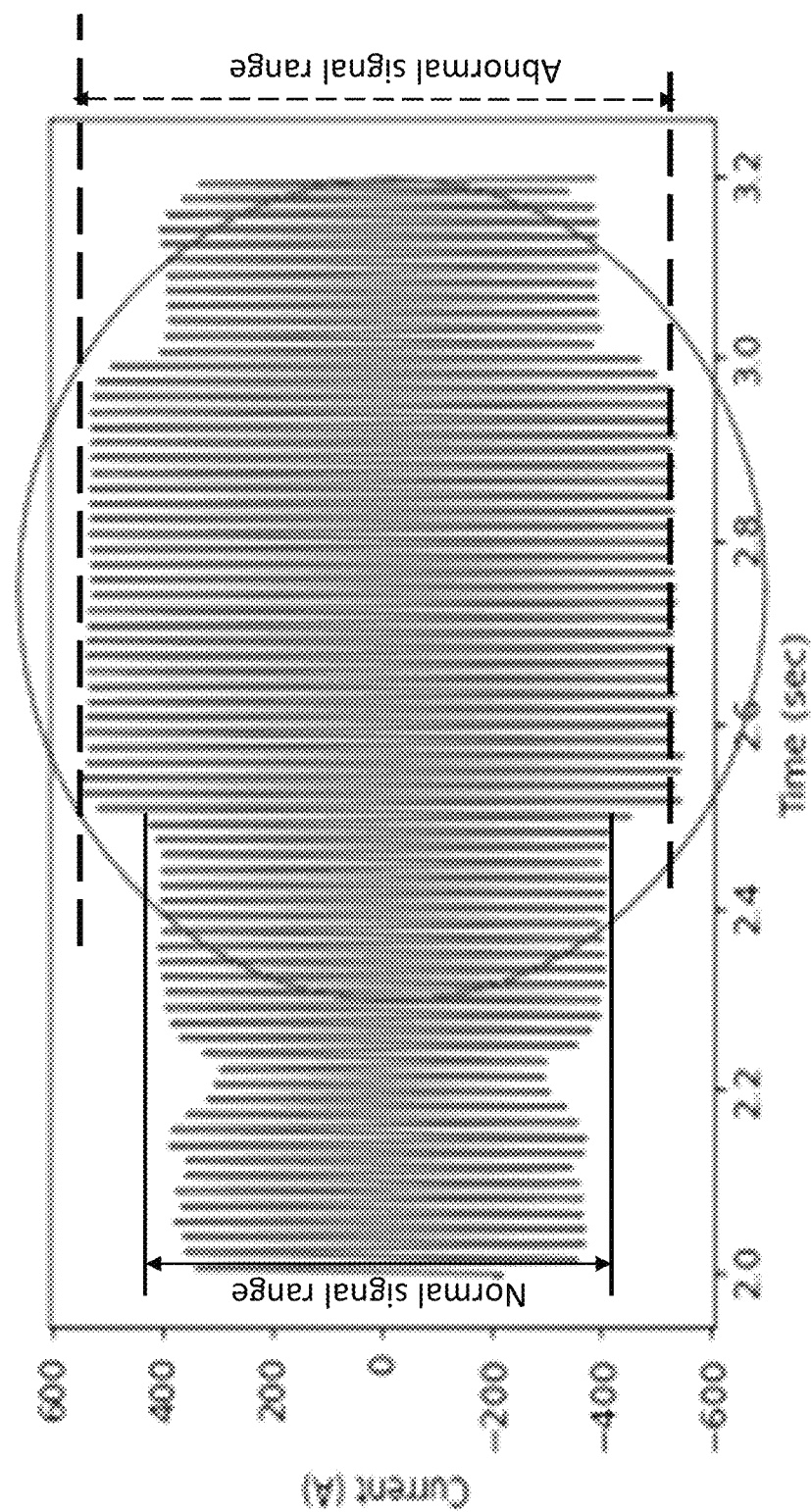
FIG. 4 is a schematic illustrating a current waveform for double line to ground (DLG) fault with IMF mode 1, according to some embodiments of the present disclosure.
Figure 5:
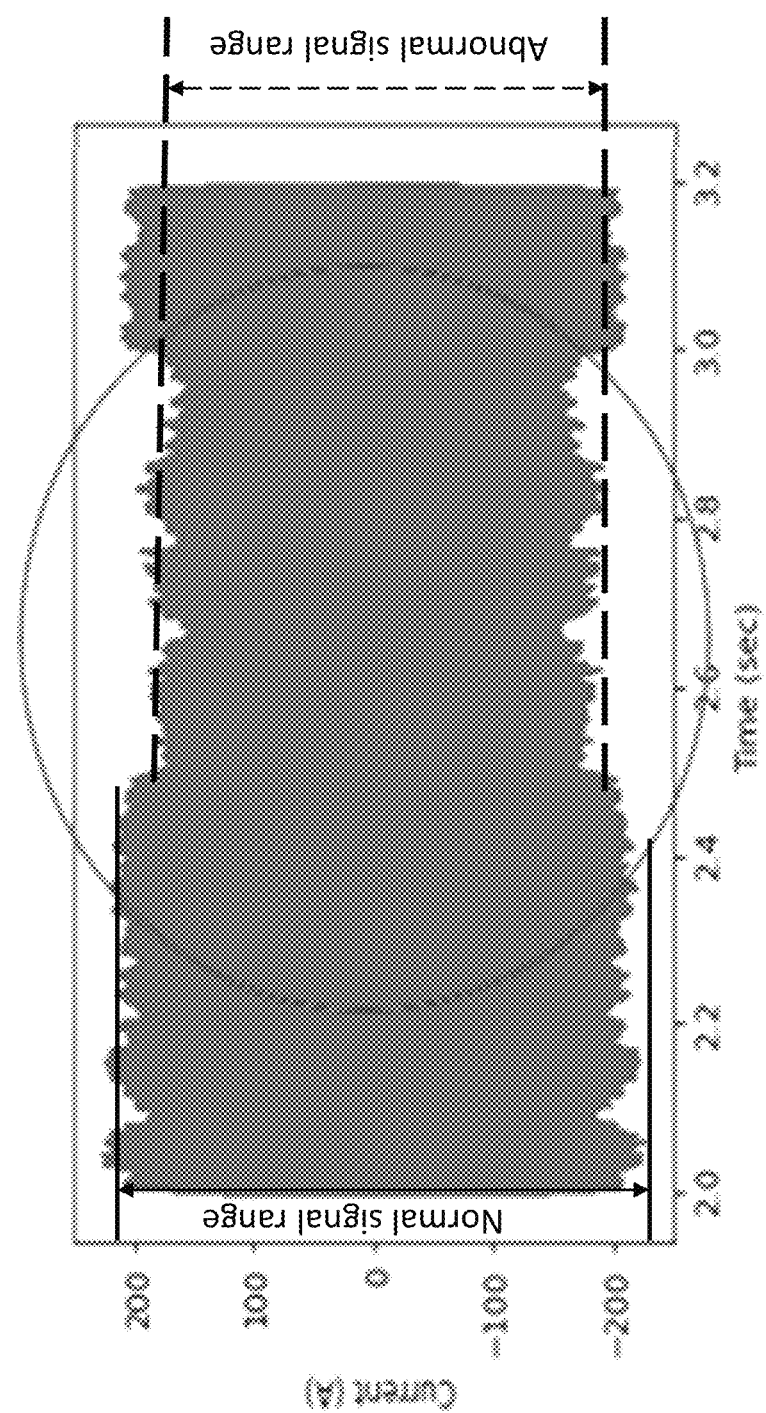
FIG. 5 is a schematic illustrating a current waveform for DLG fault with IMF mode 2, according to some embodiments of the present disclosure.

FIG. 4 and FIG. 5 illustrate the current waveforms for ABG fault with IMF mode 1, and mode 2.

As shown in FIG. 4, a similar abnormal signal variation can be identified in the waveform of current IMF mode 1 from 2.5 sec to 3.0 sec for a ABG fault occurring at the three-phase line near bus 2 with 3000Ω fault impedance. However due to the existence of fluctuations in this waveform at earlier time instances, IF 2 as shown in FIG. 5 is required to be included in the analysis to verify the existence of fault.

Figure 6:
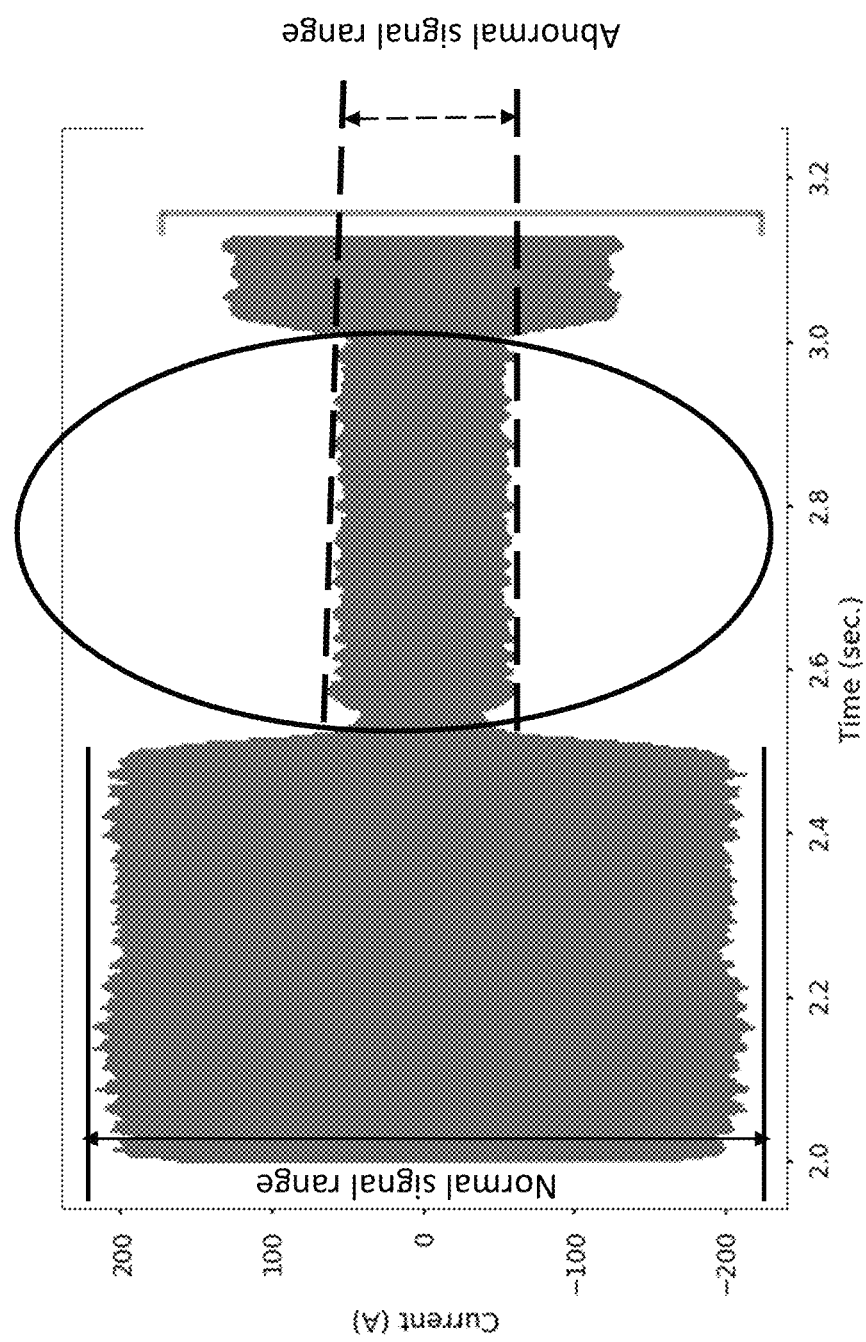
FIG. 6 is a schematic illustrating a current waveform for inverter DC-side short-circuit (DCSC) fault with IMF mode 2, according to some embodiments of the present disclosure.

FIG. 6 illustrates a current waveform for inverter DC-side short-circuit (DCSC) fault with IMF mode 2. As shown in FIG. 6, the result obtained from IMF 2 component for DCSC fault at the DC supply of GFM inverter connected at bus 4, which exhibits the existence of fault between 2.5 sec. and 3.0 sec.

Figure 7:
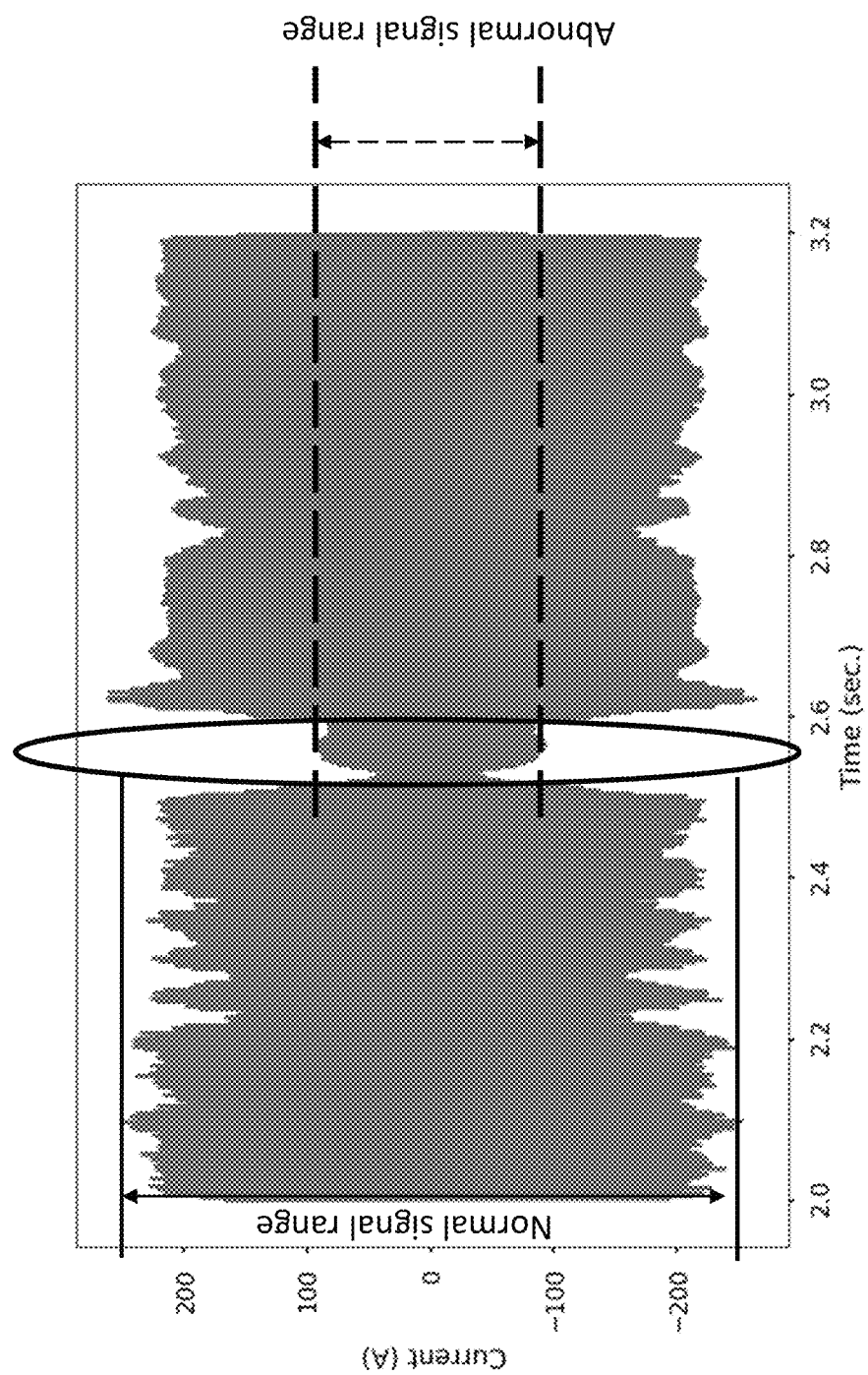
FIG. 7 is a schematic illustrating a current waveform for inverter tripping (IT) fault with IMF mode 2, according to some embodiments of the present disclosure.

FIG. 7 illustrates a current waveform for inverter tripping (IT) fault with IMF mode 2. Since IT fault is introduced at 2.5 sec., and removed at 2.6 sec., the current phasors demonstrate abnormal signal variation over this time period. Similar to ABG faults and inverter DC-side short circuit faults (DCSC), IT fault can be detected with IMF 2 component.

As demonstrated by FIGS. 3-7, VMD can effectively determining the existence of weak signal faults for islanded inverter-based microgrid.

Weak Signal Fault Localization for Islanded Inverter-Based Microgrid

The general assumption behind low impedance faults is that the measurements near the location changes to a larger extent than the measurements of the locations far away from the fault. However, this assumption is not valid for weak signal faults, since measurement deviations at all locations are too small to be detected by relays.

Localization of inverter-related faults, including inverter tripping and inverter DC-side short circuits is relatively straightforward. The current at the PCC of the tripped inverter indicates the existence of inverter tripping at respective inverter. For inverter DC-side short circuit, voltage and current phasors at the output of particular inverter is expected to demonstrate significant changes over the fault period. Accordingly, the inverter-related fault can be easily identified if abnormal signal variations are identified on the currents and voltages measured at AC sides of the inverter.

Figure 8:
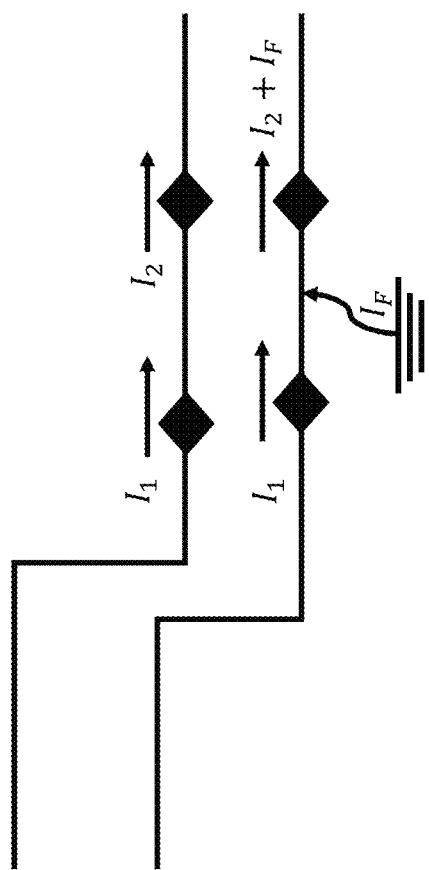
FIG. 8 is a schematic illustrating the current variations before and after fault, according to some embodiments of the present disclosure.

We focus on localization of high impedance faults by exploiting the Kirchhoff's Current Law (KCL) at the nodes of electrical circuit. For a particular branch under normal operating condition, let us assume that IEDs installed at two different locations report current $I_1$ and $I_2$ in the same branch. According to KCL, it is expected that $I_1$ and $I_2$ follow similar trend when there is no fault condition between two measurement devices. However, when a fault exists between these two measurement points, a conductive path is created between the point of fault and the ground as shown in FIG. 8, resulting in $I_1$ and $I_2$ to follow opposite trends, a behavior that will not be the case between other measurement devices in the grid. The absolute value of correlation computed between the current measurements obtained from two neighboring measurement devices is generally expected to be high and close to 1, whereas during a fault condition, the correlation will be very small due to their opposite trend in time domain. Thus, the correlation can be used to locate the fault spots.

A correlation matrix C, defined in (1) can be formed using the covariance between each pair of current measurements:

$$C = \begin{bmatrix} \text{cov}(I_1,I_1)=1 & \text{cov}(I_1,I_2) & \ldots & \text{cov}(I_1,I_m) & \ldots & \text{cov}(I_1,I_M) \\ \text{cov}(I_2,I_1) & \text{cov}(I_2,I_2)=1 & \ldots & \text{cov}(I_2,I_m) & \ldots & \text{cov}(I_2,I_M) \\ \ldots & \ldots & \ldots & \ldots & \ldots & \ldots \\ \text{cov}(I_m,I_1) & \text{cov}(I_m,I_2) & \ldots & \text{cov}(I_m,I_m)=1 & \ldots & \text{cov}(I_m,I_M) \\ \ldots & \ldots & \ldots & \ldots & \ldots & \ldots \\ \text{cov}(I_M,I_1) & \text{cov}(I_M,I_2) & \ldots & \text{cov}(I_M,I_m) & \ldots & \text{cov}(I_M,I_M)=1 \end{bmatrix} \quad (1)$$

where M is the number of measurement devices. Note that C is an M×M matrix, where its (i,j)-th element is defined as the Pearson correlation coefficient, that is, $$C(i,j) = \rho_{ij} = \frac{E(I_i I_j) - E(I_i)E(I_j)}{\sqrt{E(I_i^2)-(E(I_i))^2}\sqrt{E(I_j^2)-(E(I_j))^2}} \quad (2)$$

where $E(x)$ is the expected value of any given dataset x. Under normal condition, a correlation coefficient between two consecutive elements of the matrix, i.e., $\rho_{i(i+1)}$, is expected to be close to 1, since there is no new conductive path from any point between the location i, and its neighboring location (i+1) to the ground. However, if there is a faulty point between the location i and its neighboring location (i+1), $\rho_{i(i+1)}$ becomes a smaller value, implying that it will be less than a threshold τ.

One advantage of the disclosed method is that the covariance-based matrix is applicable for all types of line to ground faults, including single line to ground (SLG), double line to ground (DLG), and triple line to ground (TLG) faults. In addition, the disclosed method uses data obtained from IEDs that already installed at specific locations of the grid rather than from additional specific devices. Nevertheless, the disclosed correlation-based method has few limitations. Firstly, correlation between two nodes can be smaller than threshold τ for fault conditions occurred at the locations faraway from faults. Secondly, if there is an existing load or slack generator connected between these two nodes, the correlation between them can be smaller than τ. Therefore, the correlation matrix might not exclusively give a correct fault location, rather it gives us few possible fault locations (i.e., fault candidate locations), where one of these locations is the actual fault location. Although we may not get the correct location of the fault, the correlation-based approach helps us narrow down the large number of locations to only few suspicious locations (i.e, fault candidate locations).

To further narrow down the suspicious locations, a supervised K-nearest neighbors (KNN)-based method is developed incorporating power consumption profile. The k-nearest neighbors (KNN) model is a non-parametric, supervised learning classifier, which uses proximity to make classifications or predictions about the grouping of an individual data point. For classification problems, a class label is assigned on the basis of a majority vote—i.e. the label that is most frequently represented around a given data point is used. The metric to determine KNNs model is critical for an accurate classification. Euclidean distance is generally used as a metric for finding the nearest neighbors among the input dataset, in which the one-to-one distance between two points is calculated at the same time from two different datasets. For this reason, Euclidean distance does not provide accurate distance information among two time-series datasets if the datasets are not perfectly aligned to each-other in time domain. To compute the nearest neighbors for time-series input datasets in KNNs model, dynamic time warping (DTW) can be used for a more accurate distance measurement between two time-series dataset with different time-alignment. Thus, DTW is employed as a metric of the KNN model considering that power consumption profile through the branches of the microgrid is a time-series data.

The dynamic time warping algorithm is used to compute the similarity of two time series X and Y, if the heads and tails of two sequences are positionally matched, and no cross-match and no left out among two sequences. Assume the sizes of X and Y are N and M. An element of $D_{ij}$ corresponding to row i and column j of D represents the cost of between two arrays with length i and j which equals the distance between the tails, $X_i$ and $Y_j$ plus the minimum of cost in arrays with length (i−1) and j, i and (j−1), and (i−1) and (j−1):

$$D_{ij} = \text{cost}(X_i, Y_j) + \min\{D_{(i-1)j}, D_{i(j-1)}, D_{(i-1)(j-1)}\}, \quad (3)$$

where $\text{cost}(X_i,Y_j)$ is a distance function between two points, $X_i,Y_j$, such as Euclidean distance. The dynamic time warping based distance between X and Y is the last element of the cost matrix D, $D_{NM}$.

In contrast to existing works, we use power consumption data of each branch for each fault incident as inputs to KNN, and the outputs from KNN classify the branches as faulty/non-faulty. The KNN model identifies the branch that contains the faulty nodes among suspicions faulty nodes provided by the correlation matrix-based approach. Combining the results from these two methods, we can pinpoint the actual fault location in the microgrid. Higher accuracy of localization can be achieved by selecting an optimum number of neighbors K in KNN, as well as choosing correlation threshold τ. Since the power grid data contain noise, the correlation between two similar timeseries measurements can be lower than 0.99. Therefore, a value equal or greater than 0.90, such as between 0.90 and 0.98 should be suitable for threshold τ.

The KNN model is trained with denoised branch power consumption data as input, and labelled data for fault as output for a set of training cases, wherein the training cases include unfaulted cases and faulted cases, wherein faulted cases include different fault types, different fault impedances and different fault locations for the branch; wherein the number of neighbors K of KNN is preset.

The distinction of disclosed fault location method from the existing works can be described as follows: (1). Regardless of the grid configuration and topology, the current measurements at the both sides of fault location show different behavior and have relatively smaller correlation between them compared to that of between current measurements from any two different neighboring locations. (2). The KNN model uses power consumption data from all the branches of the grid. In both steps, the fault location information does not depend on the configuration and topology of the grid, rather it depends on the general behavior of current and power consumption profile in time domain. Properly tuned KNN parameters give near perfect accuracy of localization. (3). For inverter tripping and inverter DC-side short circuit, we observe that the current and voltage behaviors of only the affected inverter and corresponding PCC. Regardless of grid configuration, the affected inverters and PCCs displays the expected behaviors during fault, making the disclosed method scalable for DC-side short circuit and inverter tripping faults. Therefore, the disclosed hybrid method removes the dependence of weak signal localization on the grid structure and thereby is scalable to any large grid system.

To locate faults in the microgrid shown in FIG. 2A using above-described method, the positive sequence components of currents are used to constitute the correlation matrix C. For each type of fault at each of two fault locations, total power consumption data is extracted over 1.5 sec period (from 2 sec. to 3.5 sec.). Moreover, the fault impedance is also varied for each fault cases. To demonstrate high impedance faults, we consider three very large values of fault impedances: 1200Ω, 3000Ω, and 6000Ω. Due to 54 different combinations of fault impedance, 54 time-series power consumption data are provided for each branch, which are fed into the input of KNN. For 3 branches, the total input sample size is 165, including 3 un-faulted conditions. The output is classified as 1 when the corresponding branch contains a fault, otherwise it is classified as 0. The train and test datasets are split with 80:20 ratio. Number of neighbors, K, is varied from approximately 2 to approximately 6 to get the highest accuracy of KNN. The fault classification accuracy against the correlation matrix threshold $\tau$ is analyzed with varying $\tau$ from 0.9 to 0.98.

Referring to FIG. 2A, a 4×4 correlation matrix is created at the first step for each branch. FIGS. 9-11 depict the correlation matrices for three branches of the grid for a TLG fault, where fault is applied near bus 4. With correlation threshold $\tau$=0.9, we get three possible fault locations: element (1,2)=(2,1) of branch 1; element (2,3)=(3,2) of branch 2; and element (2,3)=(3,2) of branch 3. Since the fault is expected to make current measurements go opposite directions between two consecutive IEDs only, we consider only the elements that are one index right/left of diagonals. For example, as the (2,3)-th element of branch 3 corresponds to the point between M10 and M11, indicating a possible fault near bus 4. This result demonstrates the effectiveness of correlation matrix-based method for locating the fault. Although the bus correlation matrix-based method can indicate possible fault locations, including the actual fault location, it gives multiple suspicious locations, giving rise to the possibility of False Positive (FP) cases. FP is defined as the cases when non-faulty locations are considered as suspicious by the disclosed fault location method. After training KNN with denoised branch power consumption data as input and labelled data for fault as output, we test the accuracy of the result with test dataset. The accuracy is defined as the ratio of correct prediction to total number of test cases.

FIG. 12 shows the highest accuracy for the number of neighbors, K=3, that is, the best choice of the number of neighbors is 3. For the same experiment performed with random Gaussian noise added to the power consumption data, this table shows that the KNN accuracy remains the same.

Although correlation matrix alone can provide a set of candidates for correct faulty location, its combination with KNN can reduce the number of false positive (FP) cases. Effect of KNN on the FP cases can be observed clearly from FIG. 13. However, the number of FP cases depends on the correlation threshold $\tau$. With correlation threshold 90% and K=3, the disclosed fault location method provides the best result for locating the high impedance weak signal faults.

Weak Signal Fault Classification for Islanded Inverter-Based Microgrid

Generally, fault classification can be achieved by using superimposed sequence components of currents. For conventional grid systems, different line to ground faults can be classified by analyzing relative behavior of the superimposed current sequence components. However, for inverter-based microgrids, the positive and negative sequence currents are controlled by the converter control system's reference points. This phenomenon results in a different behavior in the current injected by inverter-based microgrids than it does for conventional grids. The disclosed fault classification method emphasis on the current sequence components' behavior in time-series measurement. Rather than focusing the sequence components measurements for single sample, the time-series attribute over the fault duration, including the moment of initialization and removal of fault, show distinct behavior for each type of faults.

Figure 14:
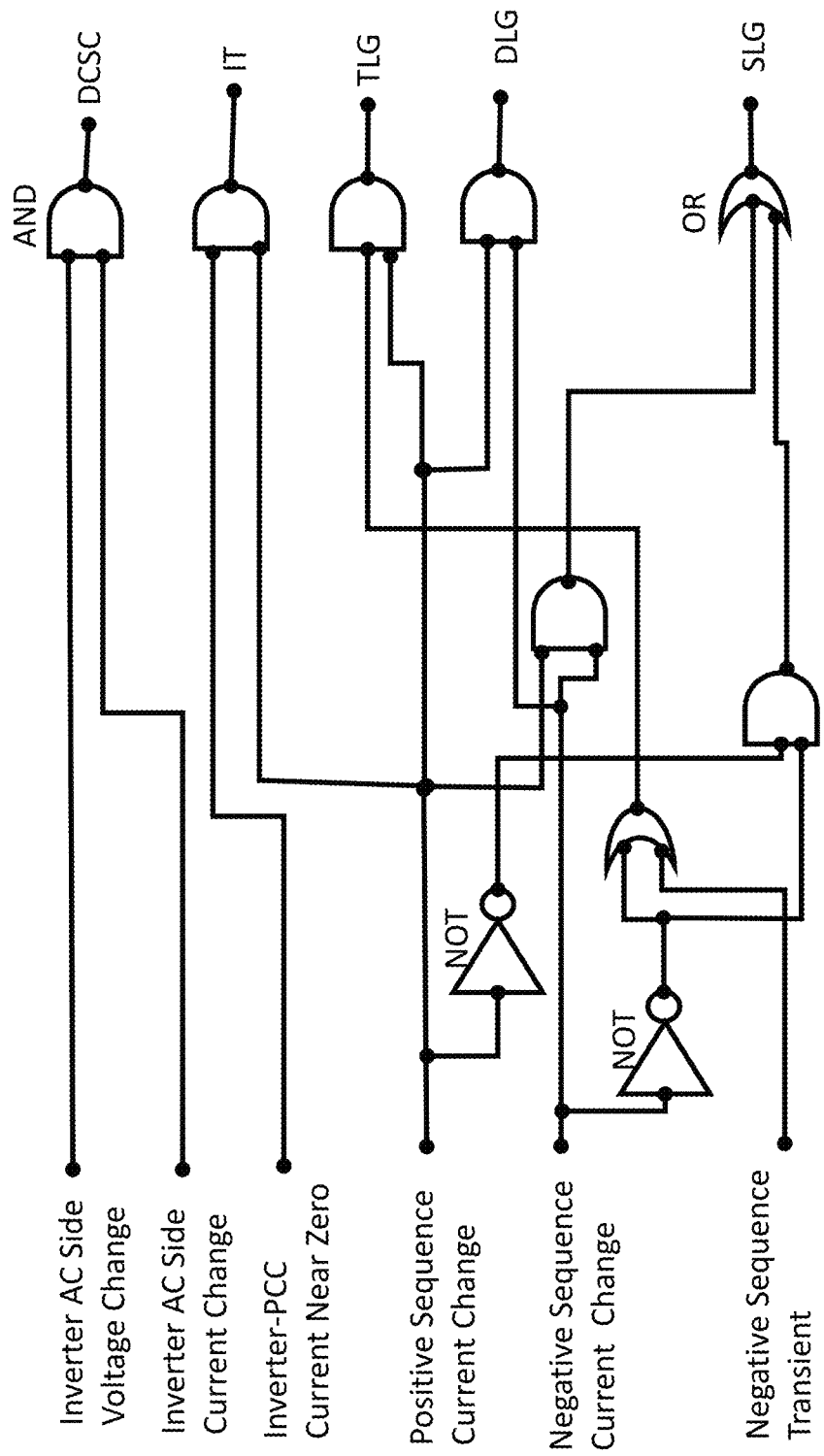
FIG. 14 is a schematic illustrating a logic circuit used for fault classification, according to some embodiments of the present disclosure.

The disclosed fault classification method is based on a logic circuit model as shown in FIG. 14. The logic circuit model defines relationship between IED time series measurements indicated fault features over fault period with weak-signal fault types. The fault types include inverter-based faults, and high-impedance faults. The inverter-based faults include inverter tripping (IT), and inverter DC-side short circuit (DCSC). The high-impedance faults include triple line to ground (TLG), double line to ground (DLG), and single line to ground (SLG). The IED measurements indicated fault features include positive sequence current change, negative sequence current change, negative sequence transient current, phase current change, phase voltage current, and inverter-PCC current near zero.

The fault classification is executed after the weak signal fault is detected by analyzing the time series measurements from $t_0$ to $t_0+T$, fault location is identified with the hybrid correlation matrix and KNN method. Once the fault location is identified between two IEDs' at the distribution line, the corresponding time series of sequence components of current measurements along with voltage and current phasor measurements from these devices are fed into the logic circuit of FIG. 14 to classify the fault type. Observations from the sequence components and phasor measurements is utilized in the logic circuit model as depicted in FIG. 14. If a particular sequence component or phasor measurement demonstrates abnormal signal variation between $t_1$ to $t_2$, the corresponding input in the logic circuit from FIG. 14 is Boolean 1, otherwise Boolean 0. The output of corresponding fault type alone will be Boolean 1, rests will be Boolean 0.

During inverter DC-side short circuit (DCSC) fault of a particular inverter, voltage and current measurements at the AC side of the affected inverter are expected to change significantly. When the sinusoidal voltage and current measurements at the AC side of a particular inverter demonstrates abnormal signal variation during fault period, corresponding fault type can be classified as inverter DC-side short circuit. As shown in FIG. 14, the DCSC fault is determined when abnormal signal variations are sensed on voltage or current phasors at AC sides of the study inverter, and on positive sequence components of currents.

For inverter tripping, the current magnitude at the PCC suffers significant reduction in the value since the inverter is disconnected from the line for a short period. Therefore, the near-zero current phasor and abnormal signal variation in positive sequence component indicates inverter tripping fault. The logic circuit dedicated in FIG. 14 shows the inverter tripping is determined when a near-zero current phasor and an abnormal signal variation in positive sequence component are sensed.

For a three phase to ground fault (TLG), positive, negative and zero sequence currents become:

$$I^+ = \frac{V_F}{Z_F}, \quad (4)$$

$$I^- = I^0 = 0,$$

where $I^+$, $I^-$ and $I^0$ are the positive, negative and zero sequence components of currents at fault location. $V_F$ and $Z_F$ are the voltages and fault impedances at the fault location. For high impedance $Z_F \gg 0$, the sequence current behaviors remain same. From (4), the positive sequence component of fault current is non-zero, therefore (4) implies an abnormal signal variation in the positive sequence component, whereas the negative sequence component should either remain same or suffer insignificant change. Therefore, as shown in FIG. 14, a TLG is determined when abnormal signal variations are sensed on the positive sequence components between fault occurring time $t_1$ to fault removal time $t_2$, and either abnormal signal variations are not sensed on the negative sequence components or negative sequence transients are sensed between $t_1$ to $t_2$.

For a SLG fault, the sequence components become:

$$I^+ = I^- = I^0 = \frac{V_F}{Z^+ + Z^- + Z^0 + 3Z_F}, \quad (5)$$

where, $Z^+$, $Z^-$, $Z^0$ are the equivalent positive, negative and zero sequence impedance of the grid viewing from fault point respectively. For $Z_F \gg Z^+, Z^-, Z^0$, all three components become approximately close to $V_F/3Z_F$. For the SLG fault, (5) shows a similar change in both positive and negative sequence components, depending on the fault impedance fault $Z_F$. For smaller fault impedance $Z_F$, both positive and negative sequence components follow insignificant change. However, for larger fault impedance $Z_F \gg Z^+, Z^-, Z^0$, both positive and negative sequence components demonstrate significant variation. Therefore, as shown in FIG. 14, a SLG is determined when abnormal signal variations are sensed both on the positive and negative sequence components between fault occurring time $t_1$ to fault removal time $t_2$, or neither on positive nor on negative components of currents between $t_1$ to $t_2$.

The sequence components for high impedance fault during a DLG fault becomes, $$I^+ = \frac{V_F}{Z^+ + \frac{Z^-(Z^0 + 3Z_F)}{Z^- + Z^0 + 3Z_F}} \approx \frac{V_F}{Z^+ + Z^-}, \quad (6a)$$

$$I^- = -I^+ \frac{Z^0 + 3Z_F}{Z^+ + Z^0 + 3Z_F} \approx -I^+, \quad (6b)$$

$$I^0 = -I^+ \frac{Z^-}{Z^- + Z^0 + 3Z_F} \approx -I^+ \frac{Z^-}{3Z_F}, \quad (6c)$$

For a DLG in (6a)-(6c), neither of the nonzero positive and non-zero negative sequence fault current components contain $Z_F$ for $Z_F \gg Z^+, Z^-, Z^0$. As a result, both of the positive and negative sequence current components display abnormal signal variation over the fault duration. The subsequent inference from this sequence components' pattern can be summarized as follows: if both the temporal positive and negative sequence components of current measurements from time of fault occurring $t_1$ to time of fault removal $t_2$ change, it is either DLG or SLG fault. However, if neither of these two sequence components change between the time $t_1$ and $t_2$, it is exclusively SLG faults.

If a normal operating condition is assumed from the initial time $t_0$ to $t_1$, and a high impedance fault occurs at $t_1$ and is removed at $t_2$, the current I throughout the grid can be analytically expressed in time domain:

$$I = I; \quad (7)$$
$$t_0 < t < t_1$$
$$I = I + I_F; \quad (8)$$
$$t_1 < t < t_2$$
$$I = I; \quad (9)$$
$$t > t_2$$

The exact value of fault current $I_F$ depends on the fault impedance, the grid topology, and the machines connected near the fault locations, therefore it is difficult to predict the exact value of the fault current under high impedance faults. In spite of using exact or a range of numerical values, the time series behavior of different sequence components during fault should give a more generalized and less topology-sensitive classification of faults. (4) to (6) give a relative behavior of sequence components during different types of faults. Time series current sequence measurements from $t_0$ to $t_0+T$, where T is a positive non-zero value and fault occurs at $t_1$ and is removed at $t_2$ ($t_2<T$), contain information about fault types such as: TLG, DLG and SLG.

Main advantage of our disclosed fault classification method is its lower sensitivity on location. The method in this disclosure detects and locates the suspected locations first, and then applies the logic circuit from FIG. 14 with the suspicious locations only. Therefore, the disclosed classification method is less prone to giving inaccurate fault type. The second advantage of our disclosed method is the scalability. As the fault location is already determined, it is enough to observe the current sequence components and phasor measurements from the suspicious locations only and fed the corresponding Boolean input to the logic circuit of FIG. 14. For more complex grid system, the fault localization reduces the suspected locations to only one or few points, therefore the accuracy of disclosed logic circuit-based method is expected to be high even for complex larger grid system. Classification of inverter DC-side short circuit (DCSC) and inverter tripping (IT) faults is the third advantage of the disclosed method over existing works, for the reason that existing works have not addressed the classification approach of these two faults.

Fault classification with the disclosed logic circuit in FIG. 14 requires Boolean input. If a particular phasor or sequence measurement demonstrates abnormal signal variations during the fault period, corresponding input signal is set 1. The output from the logic circuit indicates the fault type. Using each of line to ground faults for three different impedance level at two different locations, we have 18 possible line to ground faults. Furthermore, we have applied inverter DC-side short circuit (DCSC) separately at each of the DC supply of GFL inverter at bus 2 and GFM inverter at bus 4. Finally, each inverter is tripped near the PCC separately, making the total number of faults 22.

In summary, the fault type of the weak-signal fault is classified by a fault classification logic circuit; wherein the fault type is determined as a triple line to ground (TLG) fault if abnormal signal variations on positive sequence components of currents are identified, and either abnormal signal variations on negative sequence components of currents are not identified, or abnormal signal variations of negative sequence transient are identified; wherein the fault type is determined as a double line to ground (DLG) fault, if abnormal signal variations on positive and negative sequence components of currents are identified; wherein the fault type is determined as a single line to ground (SLG) fault, if abnormal signal variations on positive and negative sequence components of currents are identified, or abnormal signal variations on positive and negative sequence components of currents are not identified; wherein the fault type is determined as an inverter DC side short circuit (DCSC) fault, if abnormal signal variations on voltages at inverter AC side are identified, and abnormal signal variations on currents at inverter AC side are identified; wherein the fault type is determined as an inverter tripping (IT) fault, if abnormal signal variations on positive sequence components of currents are identified, and phase currents at PCC of inverter are close to zero.

Figure 15:
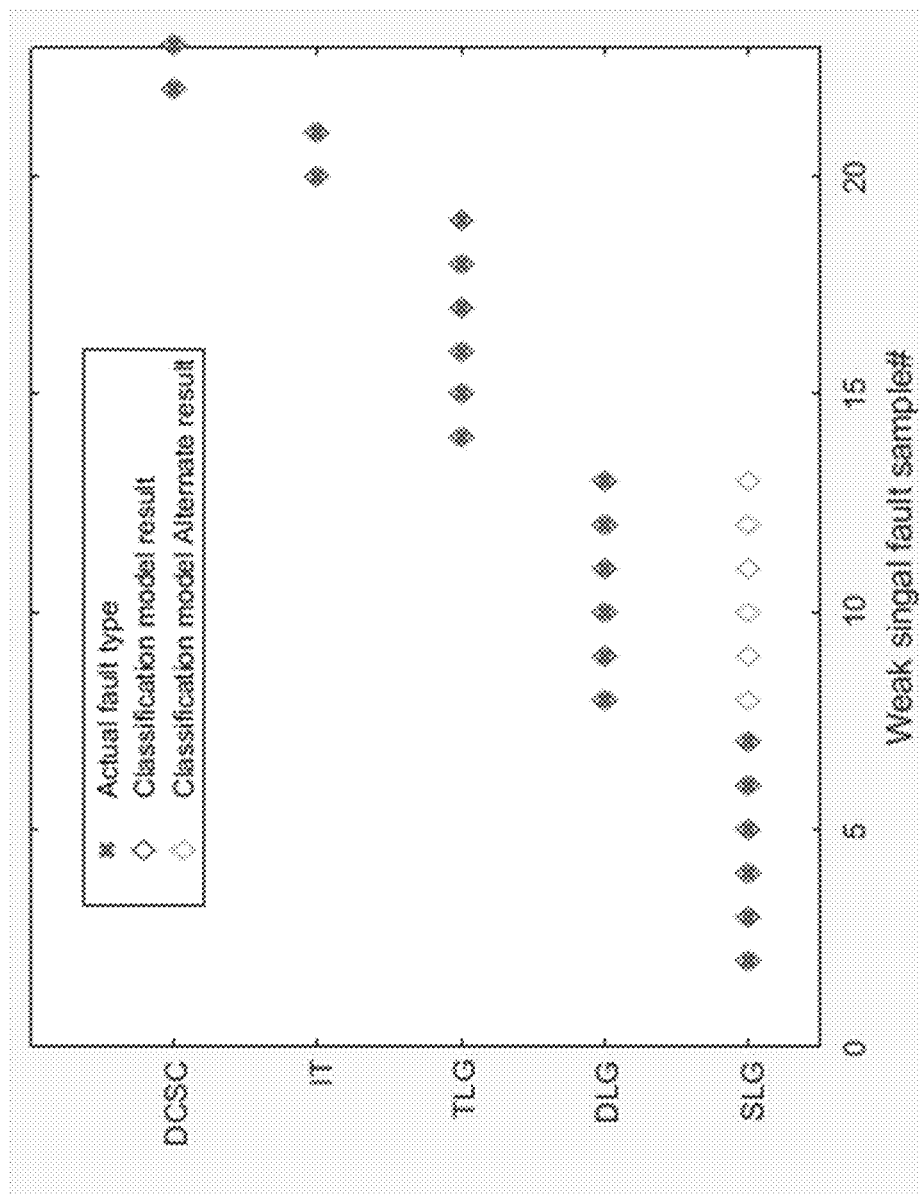
FIG. 15 is a schematic illustrating the comparison of actual fault types and classification results using disclosed logic circuit illustrated by FIG. 14, according to some embodiments of the present disclosure.

FIG. 15 shows the comparison between the classification result from disclosed logic circuit and the actual fault type. Since the disclosed method localizes the fault before executing classification algorithm, it demonstrates 100% accuracy for SLG, TLG, inverter DC-side short circuit (DCSC) and inverter tripping (IT) faults. However, for the case of DLG, the disclosed logic circuit indicates Boolean 1 for both of DLG and SLG faults. This result implies an uncertainty between DLG and SLG faults when the actual fault is DLG only. However, the mitigation and restorative techniques for DLG and SLG faults are similar, therefore this uncertainty is not expected to pose any critical issue for the system operator.

Remarks for Testing on Exemplar Islanded Inverter-Based Microgrid

From the aforementioned results, it is evident that the disclosed fault identification method can detect the weak signal faults, as well as can locate the fault accurately with properly tuned parameters even in noisy condition. Moreover, the classification method can identify correct fault type, which ensures accurate mitigation and restoration actions to maintain grid resiliency.

The disclosed fault identification method has presented an effective technique for fault detection, localization and classification of islanded inverter-based microgrids using voltage and current measurements available from conventional IEDs. At first, we have applied VMD to detect the existence of faults, with predefined mode number such as 5. Results have shown that measurements from any location of the grid can indicate the existence of weak-signal faults over the duration of the event. After detecting the presence of faults, we have applied the correlation matrix and KNN to locate the fault. Results have indicated that the correlation matrix accurately gives us the locations of the fault with relatively high FP cases. By further combining KNN with correlation matrix, we can greatly reduce the number of FP cases, from the range of 7~10 to the range of 0~3. In particular, KNN provides 100% accuracy with K=3 and the combined correlation matrix and KNN method provides 0 FP cases with threshold 0.9. Moreover, it has been shown that the accuracy of the disclosed method does not depend on measurement noise. The final part of the disclosed method is classification using relative behavior of sequence components and phasor measurements. The results display 100% accuracy for all types of faults, except with an uncertainty between double-line-to-ground (DLG) and single-line-to-ground (SLG) faults.

The invention claimed is:

1. A system for identifying an existence, location and type of a weak-signal fault in a microgrid, wherein the microgrid is connected to a main grid equivalenced as a synchronous generator, and includes at least one branch, the at least one branch including at least one line segment connected between two buses, wherein at least one of the two buses is connected with a synchronous generator, at least one bus being connected with a grid forming inverter (GFM), at least one bus being connected with a grid following inverter (GFL), and at least one bus being connected with a load, at least two switches being connected to different locations of the at least one branch, wherein each of the at least two switches is equipped with an intelligent electronic device (IED) configured to monitor and control at least one switch, wherein the microgrid is operated at islanded mode, comprising:

at least one processor; and a memory having instructions stored thereon that cause the at least one processor to perform steps of:

receiving timeseries measurements of currents and voltages from at least two IEDs installed in the microgrid;

denoising the timeseries measurements by a discrete wavelet transform (DWT) algorithm;

detecting if each of the denoised timeseries measurements indicates a weak-signal fault occurred by a frequency components analysis using a variational mode decomposition (VMD) algorithm, wherein when the weak-signal fault is detected, the at least one processor further performs:

identifying if the weak-signal fault is an inverter-related fault or a high impedance fault, wherein for the identified inverter-related fault, a fault location is determined according to currents and voltages at AC side of corresponding inverter, wherein for the high impedance fault, fault candidate locations are determined using correlation between timeseries components of the denoised timeseries measurements between the at least two IEDs for each of the at least one branch and the fault location of the weak-signal fault based on the fault candidate locations by identifying a branch containing the weak-signal fault using a timeseries K-nearest neighbors (KNN) model and a neighbor distance measured by a dynamic time warping (DTW) algorithm;

identifying a fault type of the determined weak-signal fault using a fault classification logic circuit according to variation statuses of sequence components and phasor measurements over a fault period;

producing a fault identification command indicative of the fault location and the identified fault type; and isolating and restoring the microgrid according to the fault identification command by transmitting control signals of the fault identification command to a microgrid controller of the microgrid.

2. The system of claim 1, wherein the inverter-related fault is an inverter DC side short-circuit fault or an inverter tripping fault.

3. The system of claim 1, wherein the high impedance fault is a line to ground fault with high fault impedance, wherein the type of line to ground fault is a triple line to ground fault, a double line to ground fault, or a single line to ground fault.

4. The system of claim 1, wherein the fault type of the weak-signal fault is classified by a fault classification logic circuit; wherein the fault type is determined as a triple line to ground (TLG) fault if abnormal signal variations on positive sequence components of currents are identified, and either the abnormal signal variations on negative sequence components of currents are not identified, or the abnormal signal variations of negative sequence transient are identified;

wherein the fault type is determined as a double line to ground (DLG) fault, if the abnormal signal variations on positive and negative sequence components of currents are identified;

wherein the fault type is determined as a single line to ground (SLG) fault, if the abnormal signal variations on positive and negative sequence components of currents are identified, or the abnormal signal variations on positive and negative sequence components of currents are not identified; wherein the fault type is determined as an inverter DC side short circuit (DCSC) fault, if the abnormal signal variations on voltages at inverter AC side are identified, and the abnormal signal variations on currents at inverter AC side are identified; wherein the fault type is determined as an inverter tripping (IT) fault, if the abnormal signal variations on positive sequence components of currents are identified, and phase currents at a Point of Common Coupling (PCC) of an inverter are close to zero.

5. The system of claim 4, wherein the abnormal signal variation of timeseries measurements is identified when a ratio of an absolute value of a length difference between a normal signal range of the timeseries measurements and an abnormal signal range of the timeseries measurements, over a length of the normal signal range of the timeseries measurements is greater than a faulty threshold, otherwise not identified; wherein the faulty threshold is preset; wherein the normal signal range and abnormal signal range are determined based on variation ranges of the timeseries measurements over a time period with a preset length.

6. The system of claim 4, wherein an abnormal signal variation of the timeseries measurements is identified when a ratio of an absolute value of a length difference between signal variation ranges of the timeseries measurements at two consecutive monitoring time windows, over a length of the signal variation range of the timeseries measurements at a first monitoring window of the two consecutive monitoring time windows is greater than a faulty threshold;

wherein the monitoring time windows are time intervals with identical width;

wherein the faulty threshold is preset.

7. The system of claim 1, wherein the denoising using the DWT algorithm further comprising:

first, synthesizing the timeseries measurements into different wavelet components with a preset wavelet function, a preset decomposition level and a preset signal extension mode; and then compressing noise components by applying a signal thresholding algorithm with a preset thresholding value and mode.

8. The system of claim 7, wherein the preset wavelet function is a Wavelet Daubechies 4 function, wherein the preset decomposition level is set as 5, the preset signal extension mode is of periodic-padding, the preset thresholding value is 0.4, and the preset thresholding mode is soft thresholding.

9. The system of claim 1, wherein limited number of intrinsic mode functions (IMFs) for the denoised timeseries measurements are used for detecting fault existence, wherein a number of IMF's is preset.

10. The system of claim 1, wherein the inverter-related fault is identified if abnormal signal variations are identified on the currents and voltages measured at AC sides of the inverter;

wherein an abnormal signal variation of the timeseries measurements is identified when a ratio of an absolute value of a length difference between a normal signal range of the timeseries measurements and an abnormal signal range of the timeseries measurements, over a length of the normal signal range of the timeseries measurements is greater than a faulty threshold;

wherein the faulty threshold is preset; wherein the normal signal range and the abnormal signal range are determined based on the variation ranges of the timeseries measurements over a time period with a preset length.

11. The system of claim 1, wherein the inverter-related fault is identified if abnormal signal variations are identified on the currents and voltages measured at AC sides of the inverter;

wherein an abnormal signal variation of the timeseries measurements is identified when a ratio of an absolute value of a length difference between signal variation ranges of the timeseries measurements at two consecutive monitoring time windows, over a length of the signal variation range of the timeseries measurements at a first monitoring window of the two consecutive monitoring time windows is greater than a faulty threshold;

wherein the monitoring time window is a time interval with identical width; wherein the faulty threshold is preset.

12. The system of claim 1, wherein a correlation matrix is created for each branch using positive sequence components of the denoised timeseries measurements of currents of all IEDs installed along the branch, and a candidate fault location is identified between two IEDs at the branch if a corresponding correlation is less than a correlation threshold; wherein the correlation threshold is preset between approximately 0.9 and approximately 0.98.

13. The system of claim 1, wherein the timeseries KNN model is trained with denoised branch power consumption data as input, and labelled data for fault as output for a set of training cases, wherein the training cases include un-faulted cases and faulted cases, wherein faulted cases include different fault types, different fault impedances and different fault locations for the branch; wherein a number of neighbors of KNN is preset between approximately 3 and approximately 5.

14. A method for identifying an existence, location and type of a weak-signal fault in a microgrid, wherein the microgrid is connected to a main grid equivalenced as a synchronous generator, and include at least one branch, each branch includes at least one line segments connected between two buses, at least one bus is connected with a synchronous generator, at least one bus connected with a grid forming inverter (GFM), at least one bus connected with a grid following invertor (GFL), and at least one bus connected with a load, at least two switches installed at different locations of an identical branch, and each switch is equipped with an intelligent electronic device (IED) that monitors and controls at least one switch, and the microgrid is operated at islanded mode; wherein the weak signal fault may be an inverter-related fault, or a high impedance fault; comprising:

using at least one processor; and a memory having instructions stored thereon that cause the at least one processor to perform steps of:

receiving timeseries measurements of currents and voltages from at least two IEDs installed in the microgrid;

denoising the timeseries measurements by a discrete wavelet transform (DWT) algorithm;

detecting if each of the denoised timeseries measurements indicates a weak-signal fault occurred by a frequency components analysis using a variational mode decomposition (VMD) algorithm, wherein when the weak-signal fault is detected, the at least one processor further performs:

identifying if the weak-signal fault is an inverter-related fault or a high impedance fault, wherein for the identified inverter-related fault, a fault location is determined according to currents and voltages at AC side of corresponding inverter, wherein for the high impedance fault, fault candidate locations are determined using correlation between timeseries components of the denoised timeseries measurements between the at least two IEDs for each of the at least one branch and the fault location of the weak-signal fault based on the fault candidate locations by identifying a branch containing the weak-signal fault using a timeseries K-nearest neighbors (KNN) model and a neighbor distance measured by a dynamic time warping (DTW) algorithm;

identifying a fault type of the determined weak-signal fault using a fault classification logic circuit according to variation statuses of sequence components and phasor measurements over a fault period;

producing a fault identification command indicative of the fault location and the identified fault type; and isolating and restoring the microgrid according to the fault identification command by transmitting control signals of the fault identification command to a microgrid controller of the microgrid.

15. The method of claim 14, wherein the inverter-related fault is an inverter DC side short-circuit fault or an inverter tripping fault.

16. The method of claim 14, wherein the high impedance fault is a line to ground fault with high fault impedance, wherein the type of line to ground fault is a triple line to ground fault, a double line to ground fault, or a single line to ground fault.

17. The method of claim 14, wherein the fault type of the weak-signal fault is classified by a fault classification logic circuit; wherein the fault type is determined as a triple line to ground (TLG) fault if abnormal signal variations on positive sequence components of currents are identified, and either the abnormal signal variations on negative sequence components of currents are not identified, or the abnormal signal variations of negative sequence transient are identified; wherein the fault type is determined as a double line to ground (DLG) fault, if the abnormal signal variations on positive and negative sequence components of currents are identified; wherein the fault type is determined as a single line to ground (SLG) fault, if the abnormal signal variations on positive and negative sequence components of currents are identified, or the abnormal signal variations on positive and negative sequence components of currents are not identified; wherein the fault type is determined as an inverter DC side short circuit (DCSC) fault, if the abnormal signal variations on voltages at inverter AC side are identified, and the abnormal signal variations on currents at inverter AC side are identified;

wherein the fault type is determined as an inverter tripping (IT) fault, if the abnormal signal variations on positive sequence components of currents are identified, and phase currents at a Point of Common Coupling (PCC) of an inverter are close to zero.

18. The method of claim 17, wherein the abnormal signal variation of timeseries measurements is identified when a ratio of an absolute value of a length difference between a normal signal range of the timeseries measurements and an abnormal signal range of the timeseries measurements, over a length of the normal signal range of the timeseries measurements is greater than a faulty threshold, otherwise not identified; wherein the faulty threshold is preset;

wherein the normal signal range and abnormal signal range are determined based on variation ranges of the timeseries measurements over a time period with a preset length.

19. The method of claim 17, wherein an abnormal signal variation of the timeseries measurements is identified when a ratio of an absolute value of a length difference between signal variation ranges of the timeseries measurements at two consecutive monitoring time windows, over a length of the signal variation range of the timeseries measurements at a first monitoring window of the two consecutive monitoring time windows is greater than a faulty threshold;

wherein the monitoring time windows are time intervals with identical width;

wherein the faulty threshold is preset.

20. The method of claim 14, wherein the denoising using the DWT algorithm further comprising: first, synthesizing the timeseries measurements into different wavelet components with a preset wavelet function, a preset decomposition level and a preset signal extension mode;

and then compressing noise components by applying a signal thresholding algorithm with a preset thresholding value and mode.

21. The method of claim 14, further comprising producing a normal status command while receiving the timeseries measurements of currents and voltages indicative of predetermined normal signal ranges from the at least two IEDs installed in the microgrid or a fault identification command indicative of the fault location and the identified fault type; and transmitting an operation status signal indicative of the normal status command or the fault identification command to an outside system via a network to cause a display monitor of the outside system to show an operation status of the microgrid on the display monitor.

* * * * *